(12) United States Patent
Xu

(10) Patent No.: US 9,636,956 B2
(45) Date of Patent: May 2, 2017

(54) WHEEL DIAGNOSTIC MONITORING

(71) Applicant: The Goodyear Tire & Rubber Company, Akron, OH (US)

(72) Inventor: Su Xu, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 57 days.

(21) Appl. No.: 14/532,588

(22) Filed: Nov. 4, 2014

(65) Prior Publication Data

US 2016/0121669 A1 May 5, 2016

(51) Int. Cl.
*B60Q 1/00* (2006.01)
*B60C 23/20* (2006.01)
*B60W 40/12* (2012.01)
*B60C 23/00* (2006.01)
*B60C 11/00* (2006.01)
*G01L 7/00* (2006.01)

(52) U.S. Cl.
CPC ............ *B60C 23/20* (2013.01); *B60W 40/12* (2013.01)

(58) Field of Classification Search
CPC ...... B60C 23/20; B60C 23/0408; B60C 23/02
USPC ......................................... 340/449
See application file for complete search history.

(56) References Cited

U.S. PATENT DOCUMENTS

| 4,773,011 | A | 9/1988 | VanHoose |
| 4,893,110 | A | 1/1990 | Hebert |
| 5,274,355 | A | 12/1993 | Galan |
| 5,463,374 | A | 10/1995 | Mendez et al. |
| 5,656,993 | A | 8/1997 | Coulthard |
| 5,749,984 | A | 5/1998 | Frey et al. |
| 5,780,733 | A | 7/1998 | Meunier |
| 5,801,306 | A | 9/1998 | Chamussy et al. |
| 5,886,624 | A | 3/1999 | Hebert |
| 5,895,846 | A | 4/1999 | Chamussy et al. |
| 5,900,809 | A | 5/1999 | Hebert |
| 6,118,369 | A | 9/2000 | Boesch |
| 6,246,317 | B1 | 6/2001 | Pickornik et al. |
| 6,636,790 | B1 | 10/2003 | Lightner et al. |
| 6,662,642 | B2 | 12/2003 | Breed et al. |
| 6,672,149 | B2 | 1/2004 | Hottebart et al. |

(Continued)

FOREIGN PATENT DOCUMENTS

| EP | 1270275 A2 | 1/2003 |
| EP | 2777957 A2 | 9/2014 |

(Continued)

OTHER PUBLICATIONS

USPTO, Notice of Allowance issued in U.S. Appl. No. 13/828,124 dated Mar. 17, 2015.

(Continued)

*Primary Examiner* — Jack K Wang
(74) *Attorney, Agent, or Firm* — Wood Herron & Evans LLP

(57) ABSTRACT

A method, apparatus and program product to monitor a vehicle for wheel related issues based at least in part on temperature data collected for tires of the vehicle. Received temperature data for each of a plurality of tires of the vehicle may be received and analyzed to determine whether a status of each tire is normal. Responsive to determining that a status for at least one tire is not normal, wheel related issues present for the vehicle may be detected based at least in part on the temperature data.

12 Claims, 22 Drawing Sheets

(56) References Cited

U.S. PATENT DOCUMENTS

| | | |
|---|---|---|
| 6,711,505 B2 | 3/2004 | Nakao |
| 6,741,169 B2 | 5/2004 | Magiawala et al. |
| 6,809,637 B1 | 10/2004 | Brown |
| 6,836,708 B2 | 12/2004 | Tripathi |
| 6,868,358 B2 | 3/2005 | Brown, Jr. |
| 6,876,908 B2 | 4/2005 | Cramer et al. |
| 6,879,893 B2 | 4/2005 | Woodard et al. |
| 6,879,938 B2 | 4/2005 | Asano et al. |
| 6,883,962 B2 | 4/2005 | Kurata |
| 6,917,285 B2 | 7/2005 | Boulot |
| 6,973,824 B2 | 12/2005 | Giustino et al. |
| 6,988,026 B2 | 1/2006 | Breed et al. |
| 7,009,507 B2 | 3/2006 | Naito |
| 7,043,973 B2 | 5/2006 | Shepherd et al. |
| 7,075,421 B1 | 7/2006 | Tuttle |
| 7,103,460 B1 | 9/2006 | Breed |
| 7,103,760 B1 | 9/2006 | Billington et al. |
| 7,221,262 B2 | 5/2007 | Kuchler |
| 7,272,536 B2 | 9/2007 | Potts |
| 7,301,445 B2 | 11/2007 | Moughler |
| 7,320,246 B2 | 1/2008 | Schick et al. |
| 7,323,975 B2 | 1/2008 | Hall et al. |
| 7,421,321 B2 | 9/2008 | Breed et al. |
| 7,444,210 B2 | 10/2008 | Breed et al. |
| 7,543,489 B2 | 6/2009 | Abe et al. |
| 7,555,370 B2 | 6/2009 | Breed et al. |
| 7,563,021 B2 | 7/2009 | Ichihara et al. |
| 7,594,433 B2 | 9/2009 | Bondu |
| 7,616,106 B2 | 11/2009 | Shoyama et al. |
| 7,630,802 B2 | 12/2009 | Breed |
| 7,657,504 B2 | 2/2010 | Jing et al. |
| 7,729,823 B2 | 6/2010 | Ruoppolo |
| 7,751,955 B2 | 7/2010 | Chinnadurai et al. |
| 7,783,507 B2 | 8/2010 | Schick et al. |
| 7,786,864 B1 | 8/2010 | Shostak et al. |
| 7,908,928 B2 | 3/2011 | Vik et al. |
| 8,009,027 B2 | 8/2011 | Thomas et al. |
| 8,011,236 B2 | 9/2011 | Branger |
| 8,494,704 B2 | 7/2013 | Hall et al. |
| 2001/0002451 A1 | 5/2001 | Breed |
| 2002/0044050 A1 | 4/2002 | Derbyshire et al. |
| 2002/0075145 A1 | 6/2002 | Hardman et al. |
| 2002/0092345 A1 | 7/2002 | Van Niekerk et al. |
| 2002/0130771 A1* | 9/2002 | Osborne ............ B60C 23/005 340/438 |
| 2002/0143421 A1 | 10/2002 | Wetzer |
| 2003/0006893 A1 | 1/2003 | Dunbridge et al. |
| 2003/0009270 A1 | 1/2003 | Breed |
| 2003/0214394 A1 | 11/2003 | Behrendsen |
| 2004/0130442 A1 | 7/2004 | Breed et al. |
| 2005/0125117 A1 | 6/2005 | Breed |
| 2005/0150283 A1* | 7/2005 | Shick ............... B60C 11/24 73/146 |
| 2005/0192727 A1 | 9/2005 | Shostak et al. |
| 2005/0203683 A1 | 9/2005 | Olsen et al. |
| 2005/0273218 A1 | 12/2005 | Breed et al. |
| 2006/0010961 A1 | 1/2006 | Gibson et al. |
| 2006/0025897 A1 | 2/2006 | Shostak et al. |
| 2006/0071766 A1 | 4/2006 | O'Brien et al. |
| 2006/0093015 A1* | 5/2006 | Ichihara ........... B60C 23/0408 374/45 |
| 2006/0122747 A1 | 6/2006 | Brown |
| 2007/0013502 A1 | 1/2007 | Park et al. |
| 2007/0135179 A1 | 6/2007 | Hardman et al. |
| 2007/0186634 A1 | 8/2007 | Burghardt et al. |
| 2007/0222568 A1 | 9/2007 | Morar et al. |
| 2007/0251310 A1 | 11/2007 | Pompier |
| 2007/0279203 A1 | 12/2007 | Thomas et al. |
| 2008/0018441 A1 | 1/2008 | Orrell |
| 2008/0046149 A1 | 2/2008 | Breed |
| 2008/0062004 A1 | 3/2008 | Hammerschmidt |
| 2009/0254240 A1 | 10/2009 | Olsen, III et al. |
| 2010/0185414 A1 | 7/2010 | Yamamoto |
| 2010/0207754 A1 | 8/2010 | Shostak et al. |
| 2010/0256946 A1 | 10/2010 | Carresjo et al. |
| 2011/0140876 A1 | 6/2011 | Deniau |
| 2011/0184669 A1 | 7/2011 | Liberge et al. |
| 2014/0277910 A1* | 9/2014 | Suh .................. B60C 23/02 701/31.4 |
| 2015/0101702 A1* | 4/2015 | Dean ................ B60C 23/003 141/4 |

FOREIGN PATENT DOCUMENTS

| | | |
|---|---|---|
| GB | 2429819 A | 3/2007 |
| WO | 2009073945 A1 | 6/2009 |
| WO | 2012020166 A1 | 2/2012 |

OTHER PUBLICATIONS

European Search Report, European Search Report, Application No. 15192349.7-1760, dated Mar. 15, 2016 (7 pages).

Integrated Vehicle tire Pressure Monitoring for Commercial Vehicles, 2005 American Standard, www.wabco-auto.com_fileadmin_Documents_Media_Center_Press_Releases_IVTM.

O'Connor, Mary Catherine, Michelin Shrinks Its eTire Pressure Monitor, RFID Journal, Jan. 8, 2007.

European Search Report, European Search Report, Application No. 14159083.6-1760/2777957, dated Nov. 10, 2014.

USPTO, Office Action issued in U.S. Appl. No. 13/828,124 dated Nov. 5, 2014.

X. Allan Zhong, Computational Fracture Mechanics Analysis of Truck Tire Durability, Journal of Applied Mechanics, Sep. 2006, vol. 73, 799.

\* cited by examiner

WHEEL DIAGNOSTIC MONITORING

FIELD OF THE INVENTION

The invention relates generally to tire monitoring and warning systems.

BACKGROUND OF THE INVENTION

It is well documented that maintaining a correct tire pressure improves handling, increases gas mileage, and extends the useful life of vehicle tires. Moreover, while such factors are important to the owners of individual passenger vehicles, for fleets of commercial vehicles such as tractor trailers, trucks, buses, vans, and other types of commercial vehicles, such factors may have a significant effect on profitability, both in terms of energy consumption costs and tire replacement and/or retread costs.

Despite its irrefutable importance, tire pressure may not be monitored and maintained frequently enough by many fleets, as well as many in the overall driving public. In addition, with the advent of "extended mobility tires" (EMT) and their increasingly widespread commercial presence, it may be difficult for a vehicle operator to detect a low pressure or leak condition and take appropriate action. As a result, extended use of a tire in a low pressure condition may occur.

Various legislative approaches requiring the communication of tire pressure information to the operator of a vehicle have been proposed, including a mandate that new vehicles be equipped with a low tire pressure monitoring system. Conventional tire pressure monitoring systems (TPMS's) typically incorporate a sensor located on each tire in a vehicle to perform real-time interior air pressure and temperature monitoring. The information is wirelessly transmitted to the driver via radio band frequencies (RF) and displayed in the driver compartment of the vehicle. The remote sensing module typically includes a pressure sensor, a temperature sensor, a signal processor, and an RF transmitter, and may be powered by a battery. Alternatively, a sensing module may be "passive"; that is, power may be supplied to the sensing module by way of magnetic coupling with a remote transmitter. The receiver may either be dedicated to tire pressure monitoring or share other functions in the vehicle. For instance the receiver controller may be the existing dashboard controller or the body controller. The receiver itself may further be shared with other systems using the same frequency range such as a remote keyless entry system.

A purpose of a tire monitoring system is to provide the driver with a warning should an anomaly occur in one or more tires. In some instances, tire pressure and/or temperature may be reported and/or displayed, while in other instances a simple low pressure alert may be generated. To be useful, the information must be quickly communicated and be reliable. However, displaying data derived from raw sensor measurements of temperature and pressure is not always sufficient to accurately represent the status of a tire at any given time and at various loads and conditions. The interpretation of measured data relating to temperature and pressure, therefore, is important, but has heretofore been problematic. Temperature and pressure readings by sensors in communication with a tire under conditions of actual use are influenced by various factors including heat emitted by the brakes; the thermal dissipation from the tire to the rim; load transfers that cause slight variations of the volume of the tires; and heat build-up in the tire due to its hysteretic losses. Such factors can affect the accuracy of information communicated to the driver, failing to alert the driver of marginal tire conditions under some circumstances and issuing false alarms to the driver in other instances.

Timeliness is also a concern with respect to conventional tire monitoring systems. Alerts to a driver of a low tire pressure condition may be based on simple thresholds, and once the driver is alerted due to the pressure falling below a threshold, the tire may have already reached a non-optimal state.

Consequently, a need exists in the art for processing information in a tire pressure monitoring system in an accurate and timely manner.

Furthermore, with respect to commercial vehicles, oftentimes the vehicles have more tires, travel greater distances, and a greater difficulty in resolving tire issues while in transit. For over-the-road tractor trailers, for example, the nearest service center may be tens of miles away and in many cases, a service vehicle will need to be dispatched to provide roadside assistance. In addition, from the perspective of a fleet, coordinating the service and maintenance of multiple fleet vehicles compounds these risks.

Therefore, a need also exists in the art for a tire monitoring system capable of reducing vehicle downtime, improving fuel economy, and reducing tire costs associated with fleets and the commercial vehicles used thereby.

SUMMARY OF THE INVENTION

The invention addresses these and other problems associated with the prior art by providing a method, apparatus and program product that monitor temperature data collected for tires of a vehicle to thereby monitor the vehicle to detect wheel related issues, e.g., issues including but not limited to alignment, brake, bearing, and axle issues. Consistent with embodiments of the invention, temperature data is received for one or more tires of a vehicle. The temperature data is analyzed to determine whether a status of each tire of the vehicle is normal. In response to determining that a status for at least one tire of the plurality of tires is not normal, embodiments of the invention determine whether a wheel related issue is present for the vehicle based at least in part on the temperature data.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention monitor a vehicle for wheel related issues based at least in part on temperature data for tires of the vehicle. In general, a vehicle will comprise one or more wheels, where each wheel is configured with a tire. Tire related data for a tire may be collected by a sensor associated with a tire and communicated to a processing system for analysis. Consistent with embodiments of the invention, tire related data collected for tires of a vehicle may be analyzed to detect wheel related issues for the vehicle. Accordingly, the processing system may analyze received temperature data of the tire related data to determine a status for each tire of the vehicle. The status for a tire may be determined to be normal or abnormal (i.e., not normal) based on the temperature data and/or other tire related data. Responsive to determining a not normal status for one or more tires, the processing system may further analyze temperature data for one or more tires to determine whether a wheel related issue associated with one or more wheels of the vehicle is present.

Consistent with some embodiments, the processing system may analyze the temperature data of one or more tires of the vehicle according to a model associated with a particular wheel related issue and/or the vehicle to determine whether the particular wheel related issue is present for a wheel of the vehicle. In such embodiments, the model may be based at least in part on temperature data collected for one or more vehicles, where such data was determined to correspond to a particular wheel related issue. Other variations and modifications will be apparent to one of ordinary skill in the art.

Hardware and Software Environment

Figure 1:
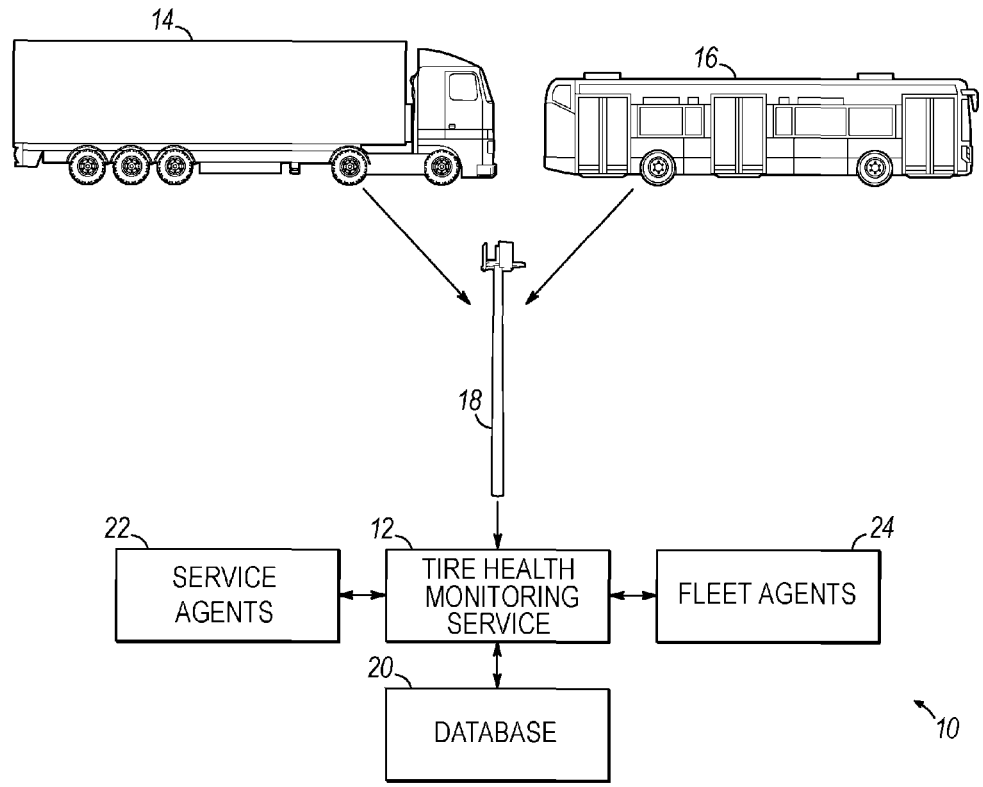
FIG. 1 is a block diagram of a tire health monitoring system consistent with the invention.

Turning now to the drawings, wherein like numbers denote like parts throughout the several views, FIG. 1 illustrates an exemplary tire health monitoring system 10 implemented as a tire health monitoring service 12 capable of monitoring a plurality of vehicles, e.g., a tractor trailer 14 and a bus 16. It will be appreciated that service 12 may be capable of monitoring the tires of practically any type of vehicle, including, for example, passenger vehicles, cars, trucks, vans, construction equipment, agricultural equipment, buses, etc., so the invention is not limited to the particular vehicles illustrated in FIG. 1.

Service 12 wirelessly communicates with vehicles 14, 16 via a network 18, e.g., via a wireless carrier, which may be operated by the same entity that operates service 12, or by a separate entity altogether, and may be public, private or proprietary in nature. Service 12 may be coupled to network 18 by wired and/or wireless communication media.

Service 12 is coupled to a database 20 that is used to store tire pressure monitoring system (TPMS) data retrieved from vehicles 14, 16, e.g., pressure, temperature, a vehicle identifier, a tire identifier, a wheel identifier, location data (e.g., GPS data), odometer information, and/or a timestamp. Moreover, as will be discussed in greater detail below, service 12 may be accessed by various entities, including, for example, service agents 22 that are either agents of the provider of service 12 or authorized representatives thereof, e.g., authorized dealers and/or service centers. Moreover, in some embodiments that monitor on behalf of fleets of vehicles, fleet agents 24 may also be provided with access to service 12. Additional interfaces, e.g., for vehicle operators or owners, administrators, etc., may also be provided in some embodiments of the invention.

Figure 2:
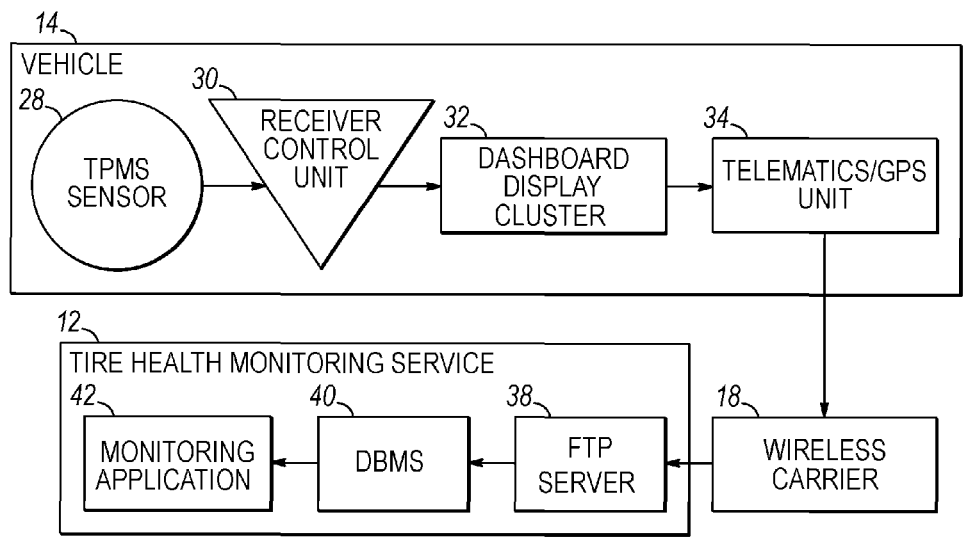
FIG. 2 is a block diagram illustrating the flow of data between components in the tire health monitoring system of FIG. 1.

FIG. 2 illustrates in greater detail the components in system 10 used to retrieve, communicate and process TPMS data. For example, on vehicle 14, a plurality of TPMS sensors 28 may be installed on each tire/wheel of the vehicle, and configured to communicate TPMS data to a receiver control unit (RCU) 30 disposed on the vehicle. The typical locations of these components are illustrated graphically by corresponding circles and inverted triangles in FIG. 2, and it will be appreciated that multiple RCU's 30 may be disposed in different locations on a vehicle in order to communicate with proximate TPMS sensors 28.

Each RCU 30 typically outputs the TPMS data to a dashboard display cluster 32 on vehicle 14, which may perform some processing of the TPMS data and may report such data to an operator, e.g., pressure readings, temperature readings, and/or low pressure and/or temperature alerts. Cluster 32 may be a programmable electronic or computer device incorporating audio and/or visual indicators or displays, and may be integrated with other on-board electronic components. In some embodiments, e.g., where no central monitoring service is used, the monitoring functionality as disclosed herein may be performed locally in vehicle 14, e.g., within cluster 32 or another on-board electronic component.

In the illustrated embodiment that does incorporate central monitoring, vehicle 14 also includes a telematics/GPS unit 34 that communicates with wireless carrier 18 to communicate TPMS data to service 12. Unit 34 may be configured to output location data generated by an integrated GPS receiver as well as additional data collected by sensors 28. It will be appreciated that the data communicated by unit 34 may be pre-processed in some embodiments or may be raw data. Furthermore, the protocol by which data is communicated to wireless carrier 18 may vary in different embodiments. Furthermore, in some embodiments, GPS sensing may be omitted. In addition, in some embodiments, bi-directional communication may be supported such that, for example, service 12 may provide the operator of vehicle 14 with alerts or status information, and may provide a mechanism by which an operator may be put into communication with a service agent, e.g., via electronic message, voice and/or video communications to address any alert conditions or coordinate service of the vehicle.

Wireless carrier 18 provides TPMS and other data provided by unit 34 to service 12, e.g., by interfacing with an FTP server 38. Server 38 passes the incoming data to a database management system 40 to log the incoming data in database 20. This data is then monitored and processed by a monitoring application 42, in the manner discussed in greater detail below.

Figure 3:
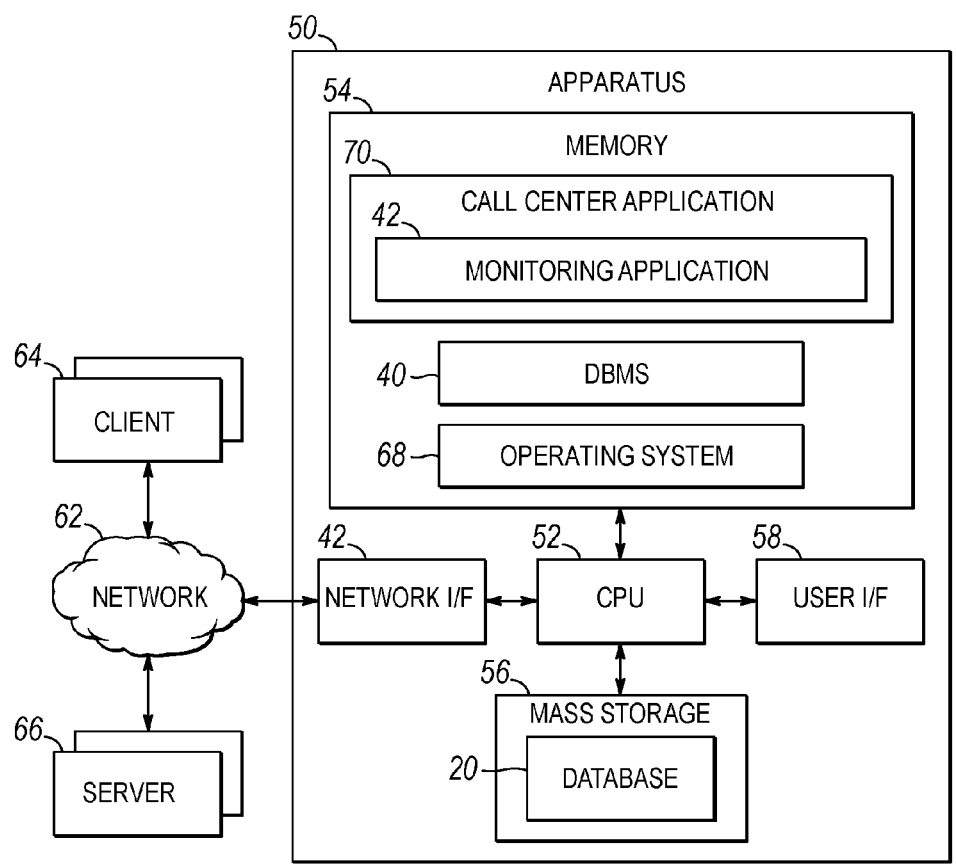
FIG. 3 is a block diagram of an exemplary hardware and software environment suitable for implementing the tire health monitoring system of FIG. 1.

Now turning to FIG. 3, an exemplary hardware and software implementation of service 12, within an apparatus 50, is illustrated. For the purposes of the invention, apparatus 50 may represent practically any type of computer, computer system or other programmable electronic device, and will be referred to hereinafter as a computer for simplicity. It will be appreciated, however, that apparatus 50 may be implemented using one or more networked computers, e.g., in a cluster or other distributed computing system, or may be implemented within a single computer or other programmable electronic device, e.g., a desktop computer, laptop computer, handheld computer, cell phone, set top box, etc.

Computer 50 typically includes a central processing unit 52 including at least one microprocessor coupled to a memory 54, which may represent the random access memory (RAM) devices comprising the main storage of computer 50, as well as any supplemental levels of memory, e.g., cache memories, non-volatile or backup memories (e.g., programmable or flash memories), read-only memories, etc. In addition, memory 54 may be considered to include memory storage physically located elsewhere in computer 50, e.g., any cache memory in a processor in CPU 52, as well as any storage capacity used as a virtual memory, e.g., as stored on a mass storage device 56 or on another computer coupled to computer 50. Computer 50 also typically receives a number of inputs and outputs for communicating information externally. For interface with a user or operator, computer 50 typically includes a user interface 58 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, computer 50 may also include one or more mass storage devices 56, e.g., a floppy or other removable disk drive, a hard disk drive, a direct access storage device (DASD), an optical drive (e.g., a CD drive, a DVD drive, etc.), and/or a tape drive, among others. Furthermore, computer 50 may include an interface 60 with one or more networks 62 (e.g., a LAN, a WAN, a wireless network, and/or the Internet, among others) to permit the communication of information with other computers and electronic devices, e.g., one or more client computers 64 (e.g., for interfacing with agents 22, 24) and one or more servers 66 (e.g., implementing other aspects of service 12). It should be appreciated that computer 50 typically includes suitable analog and/or digital interfaces between CPU 52 and each of components 54, 56, 58 and 60 as is well known in the art. Other hardware environments are contemplated within the context of the invention.

Computer 50 operates under the control of an operating system 68 and executes or otherwise relies upon various computer software applications, components, programs, objects, modules, data structures, etc., e.g., a call center application 70 (within which, for example, monitoring application 42 may be implemented). Moreover, various applications, components, programs, objects, modules, etc. may also execute on one or more processors in another computer coupled to computer 50 via network 62, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium that can be used to store the desired information and which can be accessed by computer 50. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIGS. 1-3 is not intended to limit the present invention. Indeed, those skilled in the art will recognize that other alternative hardware and/or software environments may be used without departing from the scope of the invention.

Wheel Diagnostic Monitoring

Embodiments consistent with the invention analyze temperature data of tires of a vehicle to detect any wheel related issues for the vehicle. A wheel related issue may include, for example, an alignment issue, a brake issue, a bearing issue, an axle issue, and/or other such types of issues associated with the wheels of a vehicle. A wheel related issue, however, is not considered to include issues associated specifically with a tire, e.g., related to tire pressure, tire wear, or other issues that may be indicative of a condition of a tire itself. It should be appreciated, however, that the wheel diagnostic monitoring functionality disclosed herein may be combined with tire diagnostic monitoring in some embodiments.

Consistent with embodiments of the invention, the temperature data of one or more tires of the vehicle may be analyzed with one or more models including modeled tire temperature data. In some embodiments, a model may be utilized to determine whether the status of each tire of the vehicle is normal or not normal, where such model may be based at least in part on previously collected temperature data associated with tires of the vehicle and/or on temperature data associated with tires of one or more other vehicles. In addition, consistent with some embodiments, the temperature data may be analyzed with a particular model that corresponds to a particular wheel related issue, where such model may include modeled temperature data determined to correspond to the particular wheel related issue. For example, a particular model may be developed corresponding to an alignment issue, where the model may be trained to identify alignment issues based on received temperature data. In this example, the model may be "trained" with temperature data collected from tires of vehicles determined to have an alignment issue.

Figure 4:
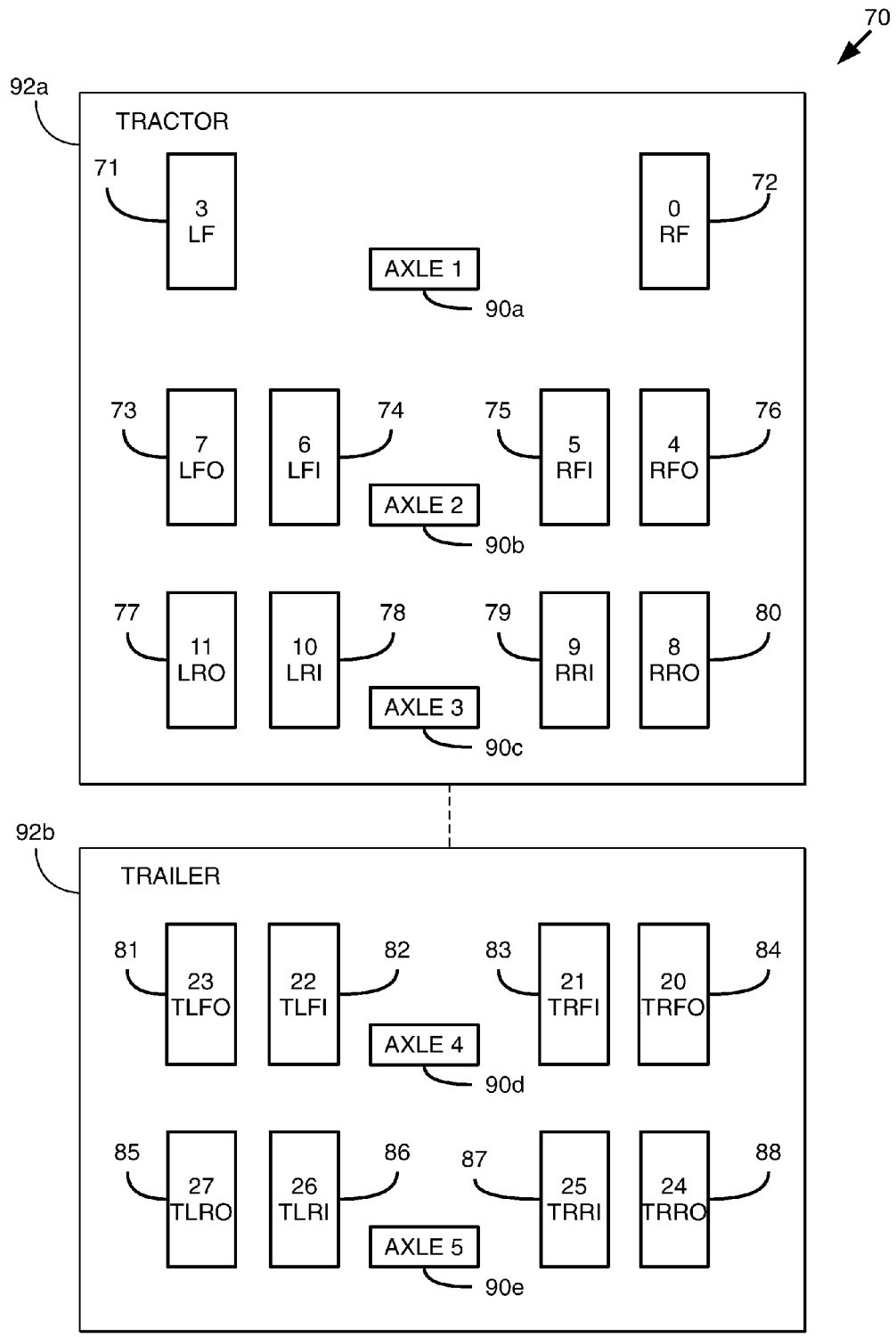
FIG. 4 is a block diagram that provides an example tire layout for an example vehicle that may be monitored for wheel related issues by the hardware and software environment of FIG. 3.

Referring to FIG. 4, this figure provides a block diagram that illustrates an example tire layout 70 for a tractor-trailer type vehicle. As shown, this example vehicle is configured with 18 wheels 71-88 (and therefore 18 tires) configured on five axles, which are labeled 'AXLE 1' 90a, 'AXLE 2' 90b, 'AXLE 3' 90c, 'AXLE 4' 90d, and 'AXLE 5' 90e. Furthermore, as illustrated, the wheels 71-88 may be generally grouped into a tractor group 92a (wheels 71-80) and a trailer group 92b. In this example, each wheel 71-88 is further labeled with a wheel identifying number as well as a positional descriptor.

As shown, the vehicle generally includes: a right front ('RF', 0) wheel 72 and a left front ('LF', 3) wheel on the first axle 90a (also referred to as "steer" wheels/tires); a right front outer ('RFO', 4) wheel 76, a right front inner ('RFI', 5) wheel 75, a left front inner ('LFI', 6) wheel 74, and a left front outer ('LFI', 7) wheel 73 on the second axle 90b (also referred to as "drive" wheels/tires); a right rear outer ('RRO', 8) wheel 80, a right rear inner ('RRI', 9) wheel 79, a left rear inner ('LRI', 10) wheel 78, and a left rear outer ('LRO', 11) wheel 77 on the third axle 90c (also referred to as "drive" wheels/tires); a trailer right front outer ('TRFO', 20) wheel 84, a trailer right front inner ('TRFI', 21) wheel 83, a trailer left front inner ('TLFI', 22) wheel 82, and a trailer left front outer ('TLFO', 23) wheel 81 on the fourth axle 90d; and a trailer right rear outer ('TRRO', 24) wheel 88, a trailer right rear inner ('TRRI', 25) wheel 87, a trailer left rear inner ('TLRI', 26) wheel 86, and a trailer left rear outer ('TLRO', 27) wheel 85 on the fifth axle 90e.

As is generally understood, each wheel 71-88 is generally configured with a corresponding tire. Consistent with embodiments of the invention, TPMS data may be collected for each tire of each wheel. Moreover, each tire may be referred to with relation to the positional descriptor (i.e., RF, LF, RFO, RFI, etc.) and/or the wheel identifying number. Embodiments of the invention generally may be utilized to monitor wheel related issues for a variety of types of vehicles, and the example tire layout 70 is therefore intended to be non-limiting and provided for illustrative purposes. Furthermore, as used herein, a related pair of tires may refer to two tires on related wheels. For example, a related pair of tires may refer to: two tires on wheels 71-88 on the same side of a common axle 90a-e (e.g., RFI 75 and RFO 76, TLRO 85 and TLRI 86, etc.); two tires on wheels 71-88 located in a similar position on an axle 90a-e (e.g., RFO 76 and LFO 73, LF 71 and RF 72, etc.); two tires on wheels 71-88 in a similar position on different axles 90a-e (e.g., RFO 76 and RRO 80, LFI 74 and LRI 78, etc.). In general, a related pair of tires may be defined by a model used to analyze temperature data, where the related pair of tires may be defined to be any two tires of a vehicle.

Figure 5:
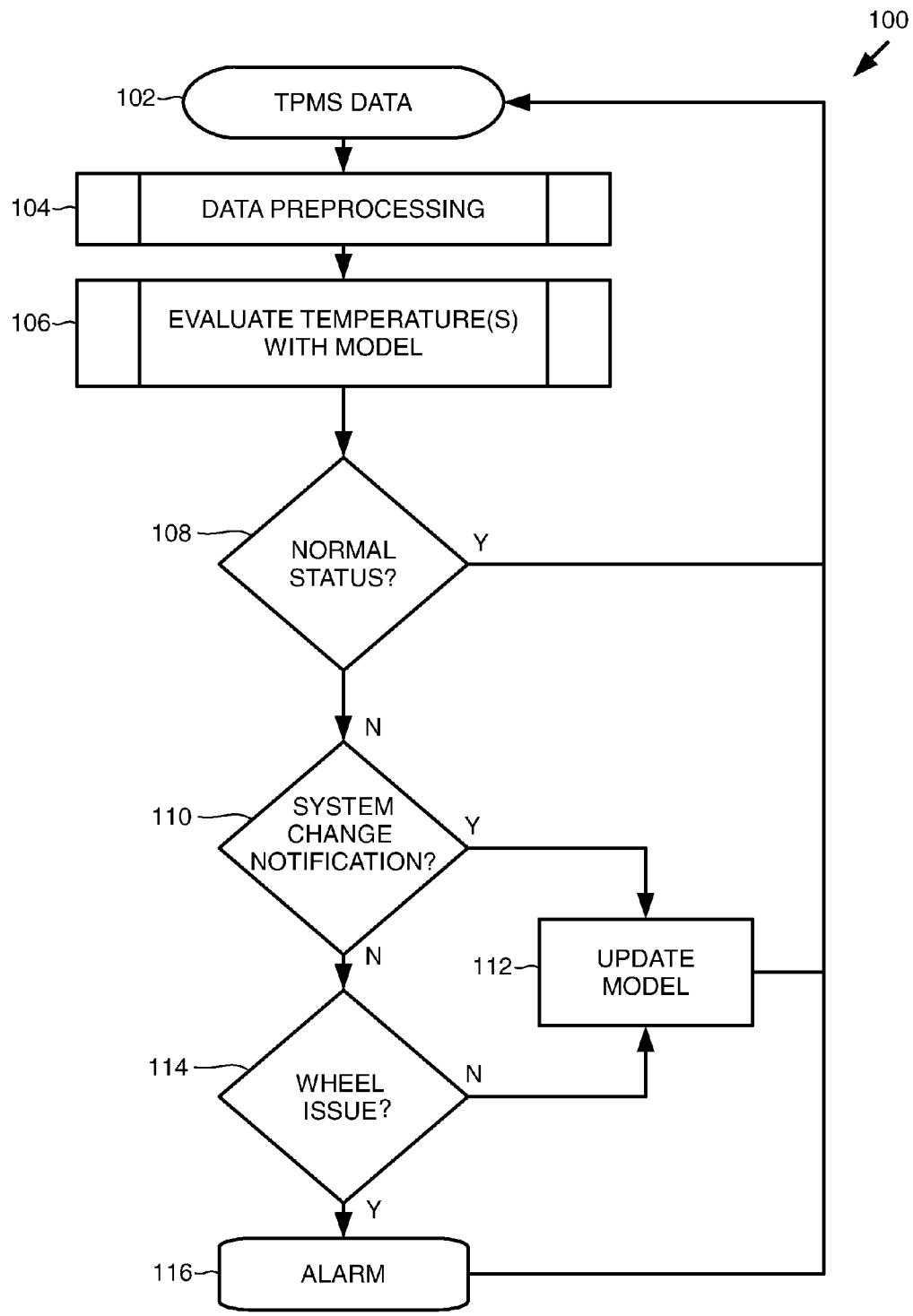
FIG. 5 is a flowchart that illustrates a sequence of operations that may be performed by the hardware and software environment of FIG. 3 to monitor a vehicle for wheel related issues consistent with embodiments of the invention.

Turning now to FIG. 5, this figure provides a flowchart 100 that illustrates a sequence of operations that may be performed by a computer consistent with embodiments of the invention to monitor a plurality of tires of a vehicle to detect wheel issues based on TPMS data (block 102) received for the plurality of tires. A wheel issue, may include for example an alignment issue, a brake issue, a bearing issue, an axle issue, and/or other such types of issues associated with the wheels of a vehicle. The computer may preprocess the received data (block 104), where such preprocessing may include filtering raw data, determining an average temperature for each tire, removing data points that are outliers and/or corresponding to undesirable periods (such as when the vehicle is parked). The preprocessed data may be evaluated based at least in part on a temperature model for the tires (block 106). In some embodiments, the temperature model may be based at least in part on temperature data for a plurality of tires of a plurality of similar vehicles. In some embodiments, the temperature model may be based at least in part on a modeled temperature profile for each type of tire.

Based on the evaluation, the computer determines whether the status for each tire of the vehicle is normal according to the model (block 108). In general, the model may define a temperature variance between types of tires, a temperature range for types of tires, and/or other such values that correspond to a normal tire (i.e., a tire that according to the temperature data is operating in a manner expected by the model). In response to determining that the status of the one or more tires of the vehicle are normal ("Y" branch of block 108), the computer continues processing TPMS data to monitor the tires of the vehicle.

In response to determining that the status of one or more tires of the vehicle are not normal according to the model ("N" branch of block 108), the computer detects whether any deliberate change to the vehicle has affected the collected TMPS data and possibly the evaluation of the temperature data with the model (block 110). A deliberate change, for example, may be an alignment correction, a tire change, and/or other such types of changes that may cause the collected TMPS data to change in manner not expected by the model. Consistent with embodiments of the invention, the computer may detect a system change to the vehicle by analyzing maintenance data associated with the vehicle, by receiving input from a user that indicates a system change, and/or the model may perform system change detection, where such system change detection may analyze the TPMS data to detect TPMS data that according to the model corresponds to a system change. In response to detecting a system change ("Y" branch of block 110), the computer updates the model with the TPMS data and information associated with the system change (block 112) such that the model is retrained based on the evaluated TPMS data associated with the system change. After updating the model, the computer may continue monitoring and analyzing TPMS data for the tires of the vehicle to detect wheel related issues.

In response to determining that a system change did not occur ("N" branch of block 110), the computer analyzes the TPMS data according to a model to determine whether the TPMS data indicates a type of wheel related issue (block 114). In general, the model may include patterns of data associated with one or more types of wheel related issues, including for example, patterns of temperature data that have been associated with an alignment issue, a brake issue, a bearing issue, an axle issue, and/or other such types of wheel related issues. In response to determining that the TPMS data does not indicate a type of wheel related issue ("N" branch of block 114), the computer updates the model (block 112), such that one or more models are retrained according to the evaluated TPMS data that was determined to not indicate a wheel related issue. After updating the model, the computer may continue monitoring and analyzing TPMS data for the tires of the vehicle to detect wheel related issues. In response to determining that the TPMS data indicates a wheel related issue ("Y" branch of block 114), the computer generates an alarm indicating that a wheel related issue has been detected for the vehicle (block 116). Consistent with some embodiments of the invention, the alarm may indicate the type of the detected wheel related issue and/or information about the vehicle.

Figure 6:
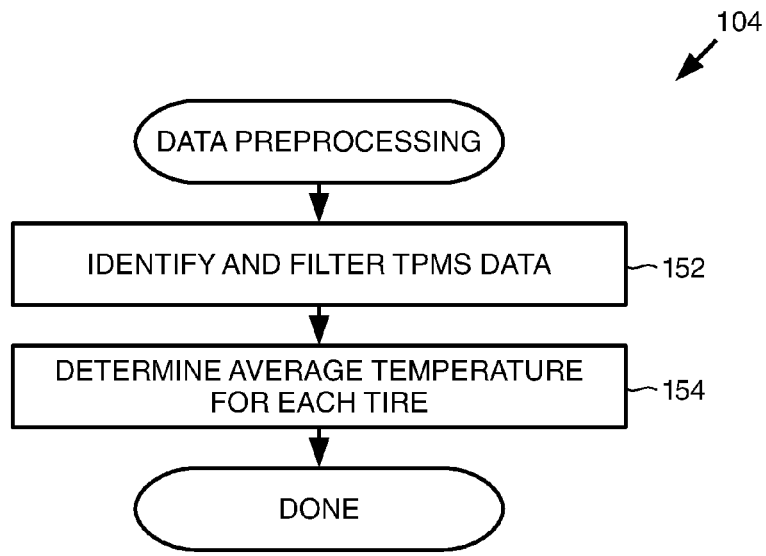
FIG. 6 is a flowchart that illustrates a sequence of operations that may be performed by the hardware and software environment of FIG. 3 to preprocess data when monitoring a vehicle for wheel related issues consistent with embodiments of the invention.

FIG. 6 provides a flowchart 104 that illustrates a sequence of operations that may be performed by a computer consistent with embodiments of the invention to preprocess received TPMS data as shown in block 104 of FIG. 5. The computer may identify and filter TPMS data for one or more periods (block 152). Consistent with some embodiments of the invention, the computer may determine TPMS data to be filtered out. For example, the computer may identify TPMS data collected when the vehicle was parked. In such embodiments, the computer may analyze odometer data and/or GPS data to determine TPMS data collected when the vehicle was parked. As another example, the computer may identify and filter outliers, such as out of range values, that may be associated with a faulty sensor, collection, and/or transmission equipment (e.g., the TPMS sensor 28, the RCU 30, etc.). As another example, the computer may compensate and/or filter temperature data of the TPMS data based at least in part on another type of data included in the TPMS data. After filtering the TPMS data, the computer may determine an average temperature for each tire of the vehicle (block 154) for a defined time period (e.g., a day, a week, etc.).

Figure 7:
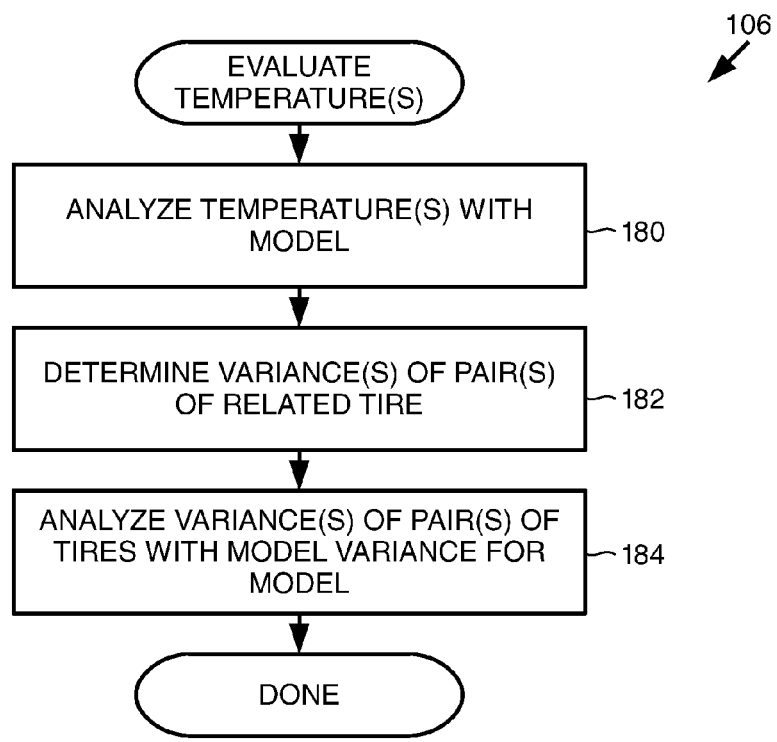
FIG. 7 is a flowchart that illustrates a sequence of operations that may be performed by the hardware and software environment of FIG. 3 to evaluate temperature data associated with one or more tires of a vehicle when monitoring a vehicle for wheel related issues consistent with embodiments of the invention.

Turning now to FIG. 7, this figure provides a flowchart 106 that illustrates a sequence of operations that may be performed by a computer consistent with embodiments of the invention to evaluate temperature data for one or more tires of the vehicle as shown in block 106 of FIG. 5. Consistent with embodiments of the invention, the computer may analyze temperature data of the TPMS data with a temperature model developed based on temperature data for new tires and/or a plurality of tires of one or more vehicles. Consistent with some embodiments, the model may include modeled temperature data corresponding to dates and/or regions. For example, tire temperature data collected during February may differ from tire temperature data collected during August, and in this example, tire temperature data collected for a particular week in February may be analyzed based on model temperature data corresponding to the particular week in February. Similarly, tire temperature data for tires of a vehicle located in a particular region may be analyzed based on model temperature data corresponding to the particular region. As a further example, tire temperature data for tires of a particular vehicle may be analyzed based on a model that is based on historical temperature data for the particular vehicle.

Moreover, tire temperature data may generally be determined for related pairs of tires of the vehicle and a variance between temperatures (or average temperatures) of each tire of the related pair may be determined (block 182). For example, and referring to the example tire layout 70 of FIG. 4, a related pair of tires may be for example, an inner-outer pair of tires on a particular axle (e.g., the tire for the RFI wheel 75 and the tire for the RFO wheel 76), an inner-inner pair of tires on a particular axle (e.g., the tire for the RRI wheel 79 and the tire for the LRI wheel 78), and/or other such pairs. Consistent with some embodiments of the invention, the computer may analyze determined variance for related tires with the model, where the model may include model variances for related tire pairs (block 184). In general, embodiments of the invention may determine one or more variances for one or more related pairs. For example, more than one variance may be determined for a particular associated tire, such as a variance between a RFI tire and a RFO tire as well as a variance between the RFI tire and a LFI tire. Such related tire variances may be determined for one or more defined related pairs, where the tires of each pair may overlap. Based on the determined average temperatures of one or more tires and/or the determined variances between related pairs of tires, embodiments of the invention may determine whether the status of each tire is normal. Furthermore, based on the determined average temperatures of one or more tires and/or the determined variances between related pairs of tires, embodiments of the invention may detect a wheel issue for the vehicle and/or identify a type associated with a detected wheel issue.

Figure 8:
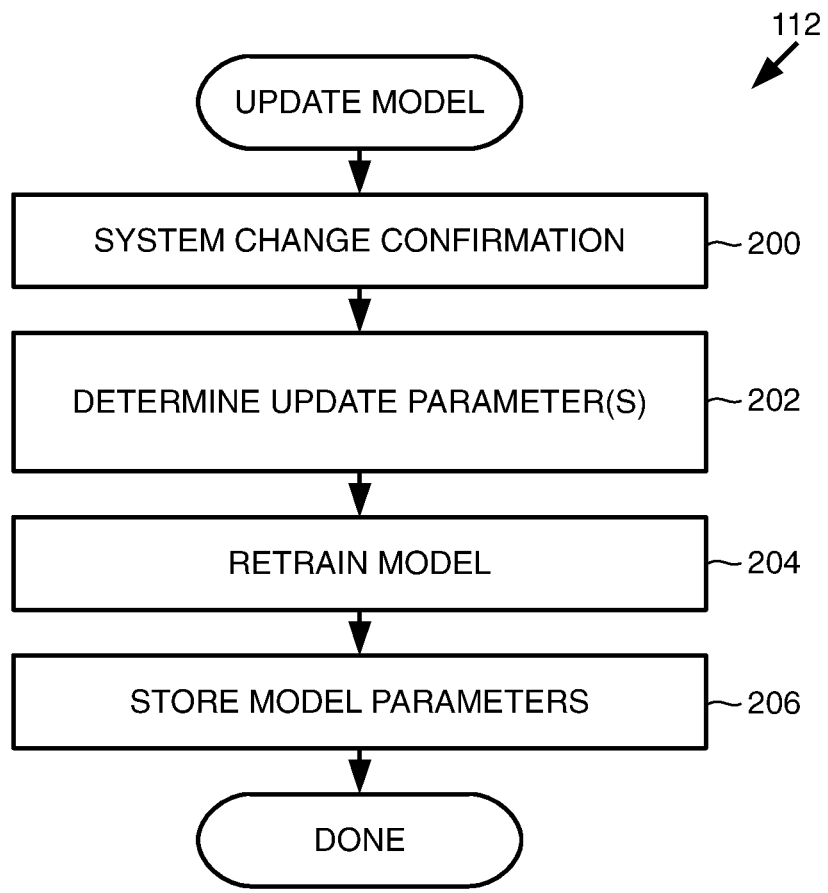
FIG. 8 is a flowchart that illustrates a sequence of operations that may be performed by the hardware and software environment of FIG. 3 to update a model that may be utilized to monitor a vehicle for wheel related issues consistent with embodiments of the invention.

FIG. 8 provides a flowchart 112 that illustrates a sequence of operations that may be performed by a computer consistent with embodiments of the invention to update a model that is maintained to detect wheel related issues for a plurality of vehicles as shown in block 112 of FIG. 5. As discussed previously, a system change for the vehicle may lead to the TPMS data from the tires of the vehicle being determined to be non-normal status. Therefore, some embodiments of the invention may confirm a system change notification (block 200) if applicable. For example, after a system change, a maintenance technician may confirm a system change for a vehicle, which may be stored in a record associated with the vehicle in a database. In this example, the computer may analyze the record associated with the vehicle to confirm the system change.

The computer may determine update parameters for the model (block 202). As shown in FIG. 5, the model may be updated responsive to detecting a system change and/or not detecting a wheel issue. Consistent with embodiments of the invention, the model may be updated with information corresponding to temperature data of one or more tires that caused the status to be determined as non-normal. Therefore, the computer may determine one or more parameters to be updated based on the analyzed temperature data. Using such determined update parameters, the model may be retrained (block 204). Therefore, if analysis of temperature data according to the model results in determining that one or more tires of the vehicle do not have a normal status but also do not correspond to a wheel related issue, the model may be retrained based on the temperature data. After retraining the model, model parameters associated with the vehicle are stored with the model (block 206).

Figure 9:
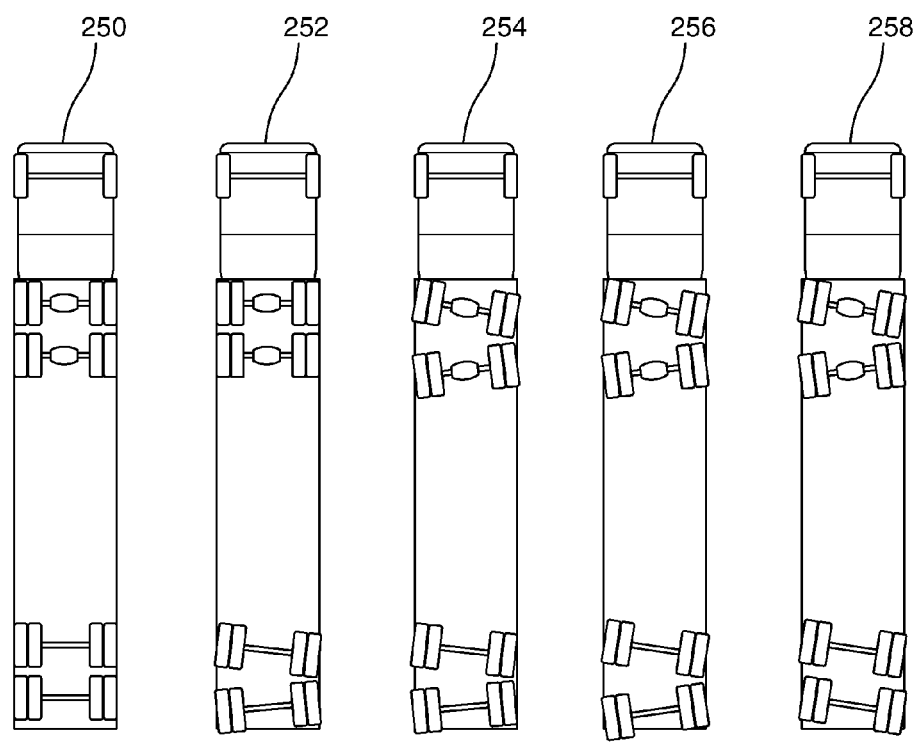
FIG. 9 is a block diagram that illustrates example trucks with various axle alignments for which tire related data may be received and analyzed by the hardware and software environment of FIG. 3.

FIG. 9 provides an example diagram that illustrates an aligned tractor-trailer vehicle 250 and four other tractor-trailer vehicles 252-258 with various alignment issues. In general, an aligned vehicle will achieve better fuel efficiency, and tires of an aligned vehicle will wear more evenly, requiring less frequent replacement and/or retreading. As shown, for the aligned truck 250 the axles of the truck are generally aligned. For a second truck 252, axles of the trailer are out of alignment with the other axles. The remaining trucks 254-258 have tractor axles and trailer axles out of alignment. As discussed, misaligned axles may lead to decreases in fuel efficiency. Consistent with embodiments of the invention, a misaligned axle may be detected based on TPMS data received for tires of the vehicle.

Figure 10:
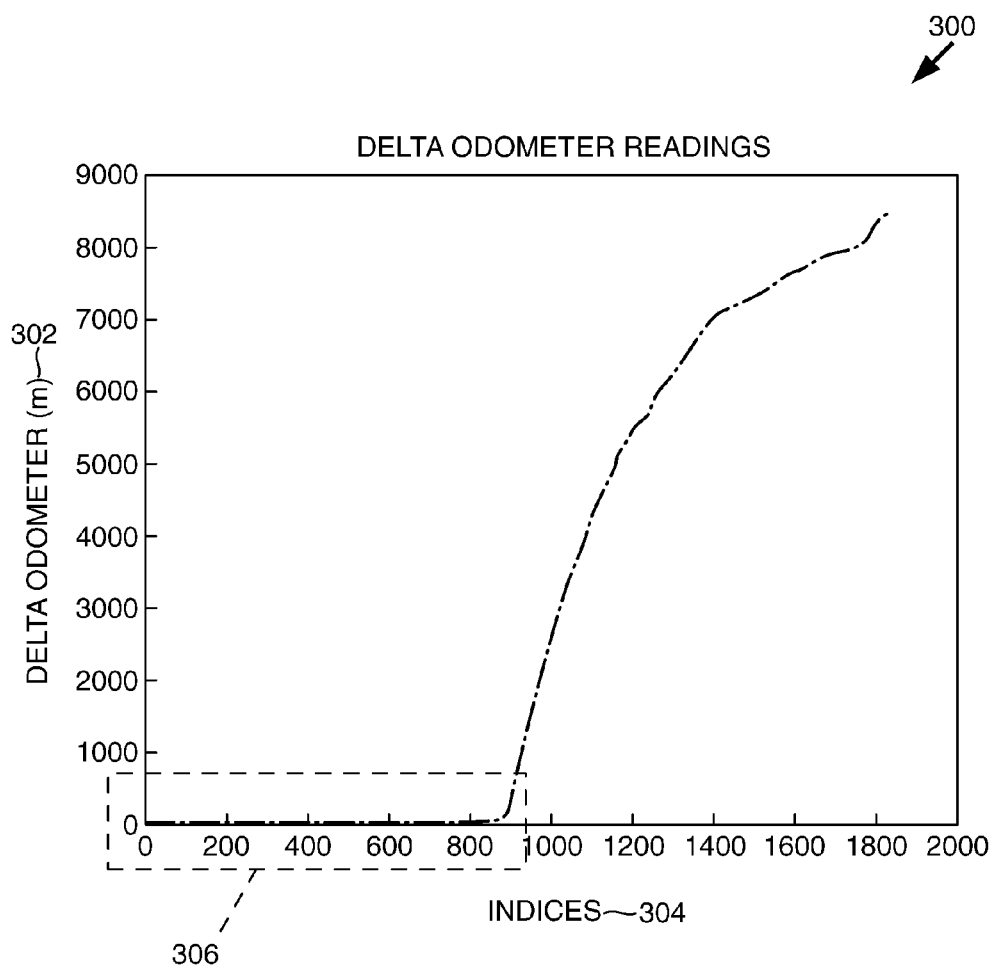
FIG. 10 is an example chart of delta odometer data for a truck that may be received and analyzed by the hardware and software environment of FIG. 3.

FIG. 10 provides an example chart 300 that illustrates delta odometer data (in meters) for a vehicle (302) for collected data points of TPMS data (i.e., indices) 304. As discussed at block 152 of FIG. 6, embodiments of the invention may filter TPMS data. In this example, a portion 306 of TPMS data is identified as corresponding to a period when the vehicle has been parked. As discussed, such analysis and filtering may be based at least in part on the TPMS data, and in this example, delta odometer data may be used to identify and filter portions of the TPMS data corresponding to a period when the vehicle is parked.

Figure 11:
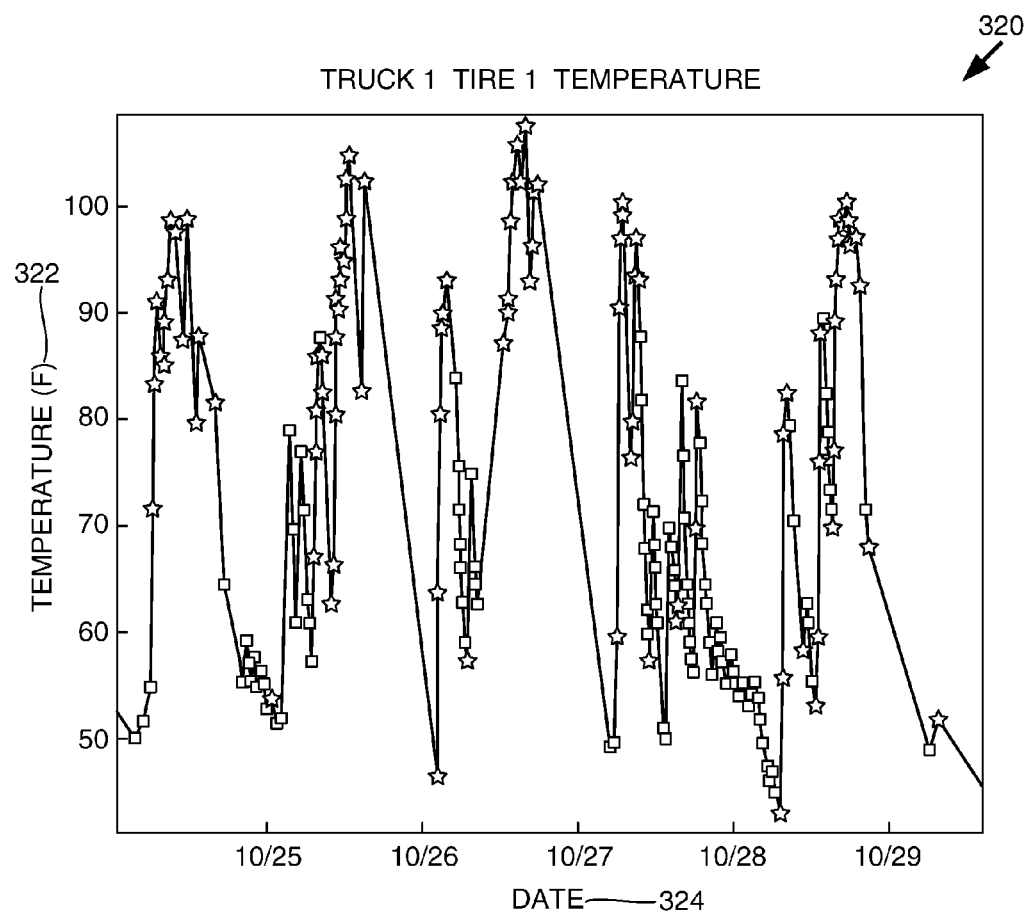
FIG. 11 is an example chart of temperature data for a tire of a truck that may be received and analyzed by the hardware and software environment of FIG. 3.
Figure 12:
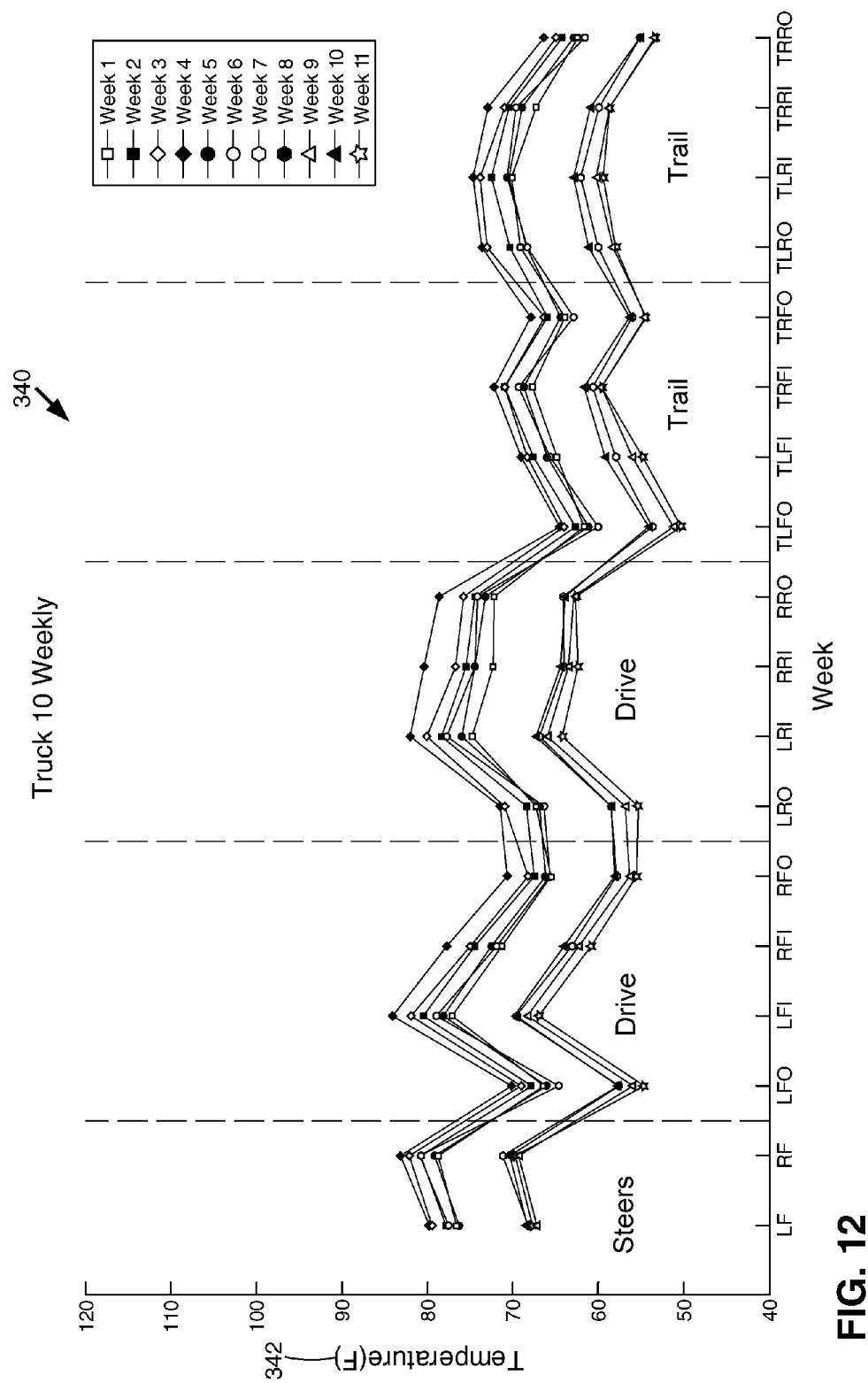
FIG. 12 is an example chart of weekly average temperature values for tires of a truck that may be received and analyzed by the hardware and software environment of FIG. 3.
Figure 13:
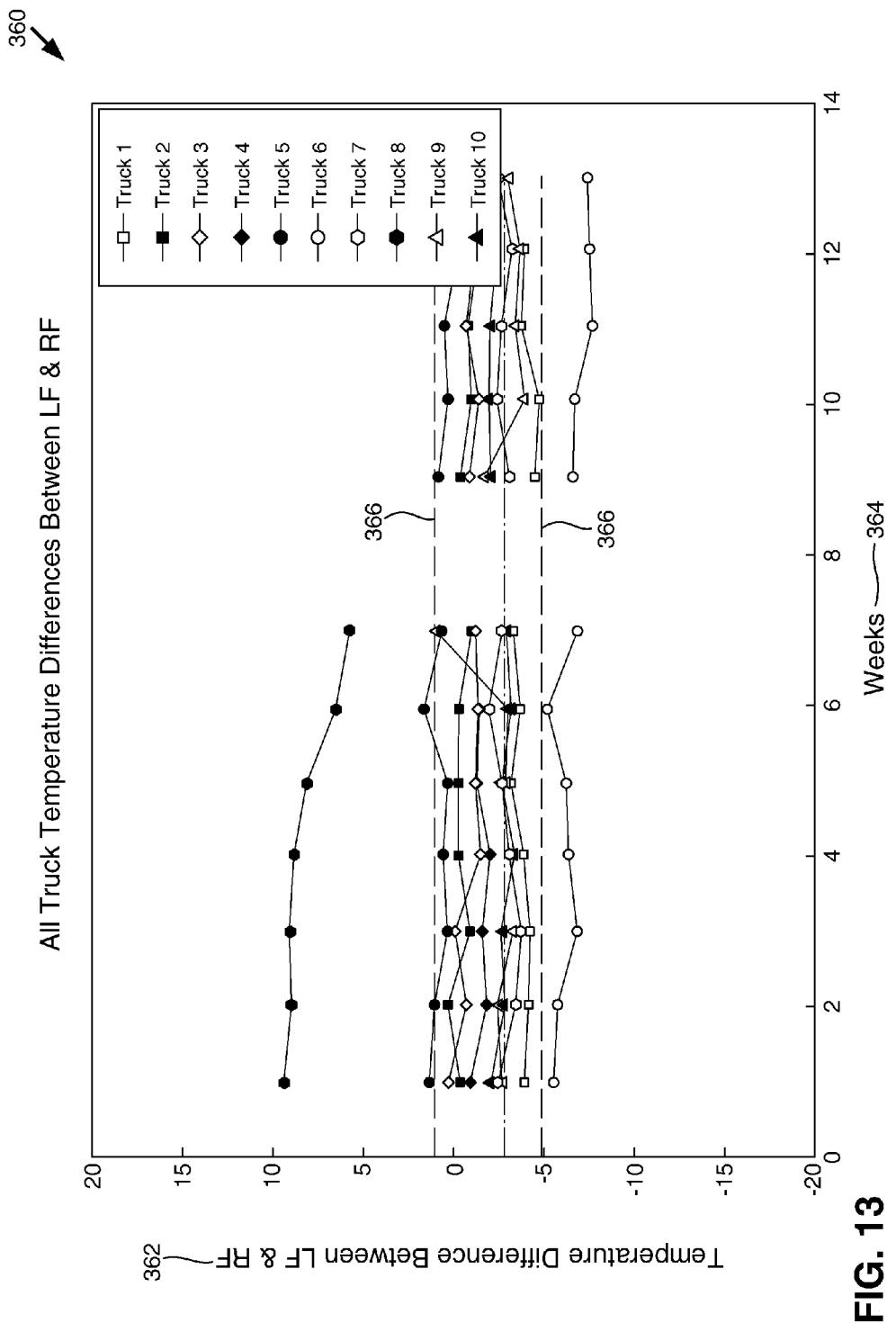
FIG. 13 is an example chart of variances between left front tire average temperatures and right front tire average temperatures for a plurality of trucks that may be analyzed by the hardware and software environment of FIG. 3.

FIG. 11 provides an example chart 320 that illustrates collected temperature data 322 of TPMS data for a particular tire of a particular vehicle (in this example, 'Truck 1 tire 1') for days of a time period 324. In FIG. 11, the highlighted data points (illustrated as stars in the chart 320) may correspond to data points collected during operation (e.g., driving mode). FIG. 12 provides an example chart 340 that illustrates weekly average temperatures 342 for each tire 344 of a particular vehicle (in this example, Truck 10). As discussed, in some embodiments, the average temperature for each tire may be determined for a desired period of time based on the received TPMS data. As shown in this example, average temperatures for each tire 344 are provided for each of eleven weeks. FIG. 13 provides an example chart 360 that illustrates a determined variance 362 (in this example, a temperature difference between a LF and a RF tire) for 10 vehicles (in this example, trucks numbered 1-10) over a 14 week period 364. As shown in this example, the variance for Trucks 6 and 8 exceeds a predefined threshold 366, which indicates that the LF and RF tires of trucks 6 and 8 are abnormal.

Figure 14:
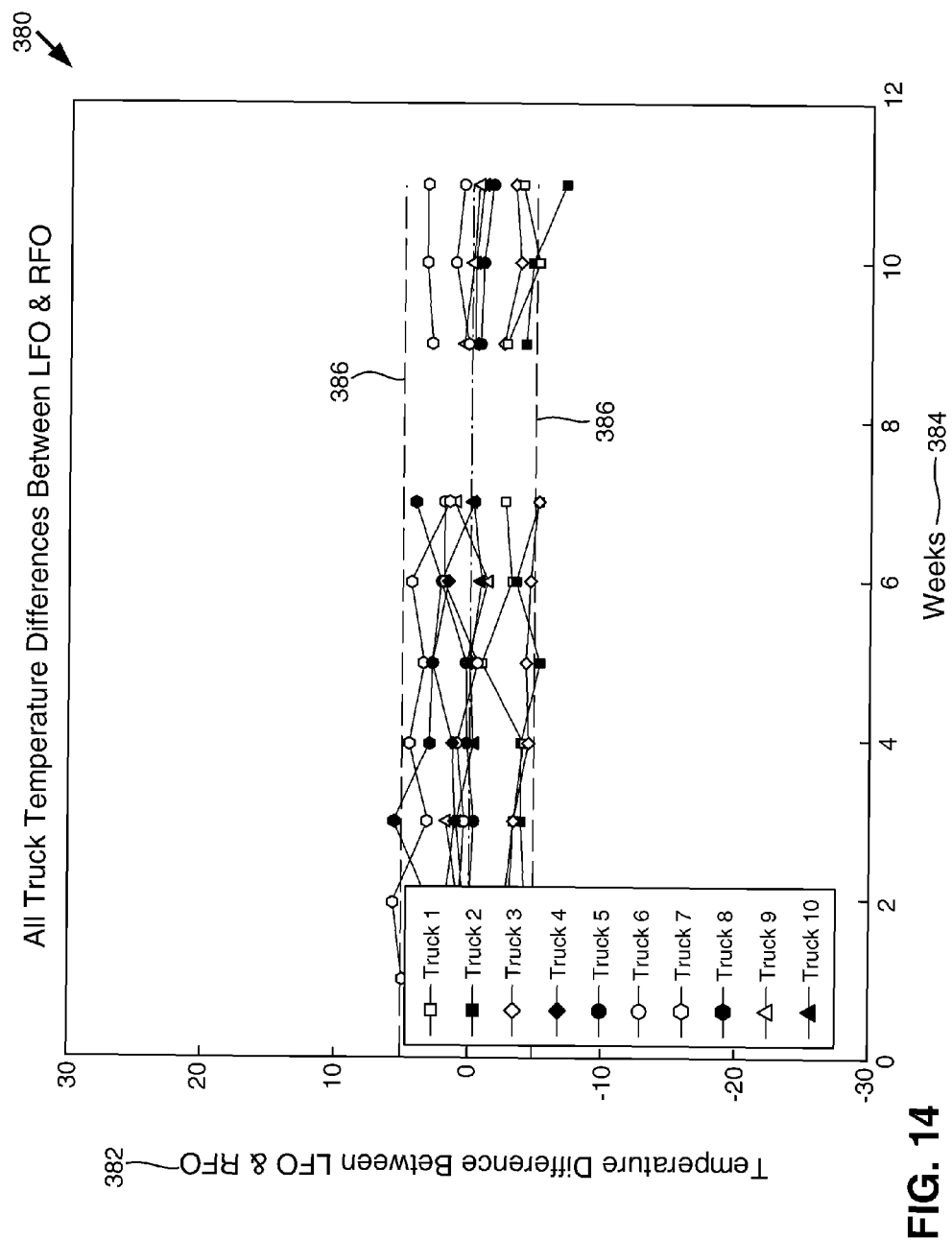
FIG. 14 is an example chart of variances between left front outer tire average temperatures and right front outer tire average temperatures for a plurality of trucks that may be analyzed by the hardware and software environment of FIG. 3
Figure 15:
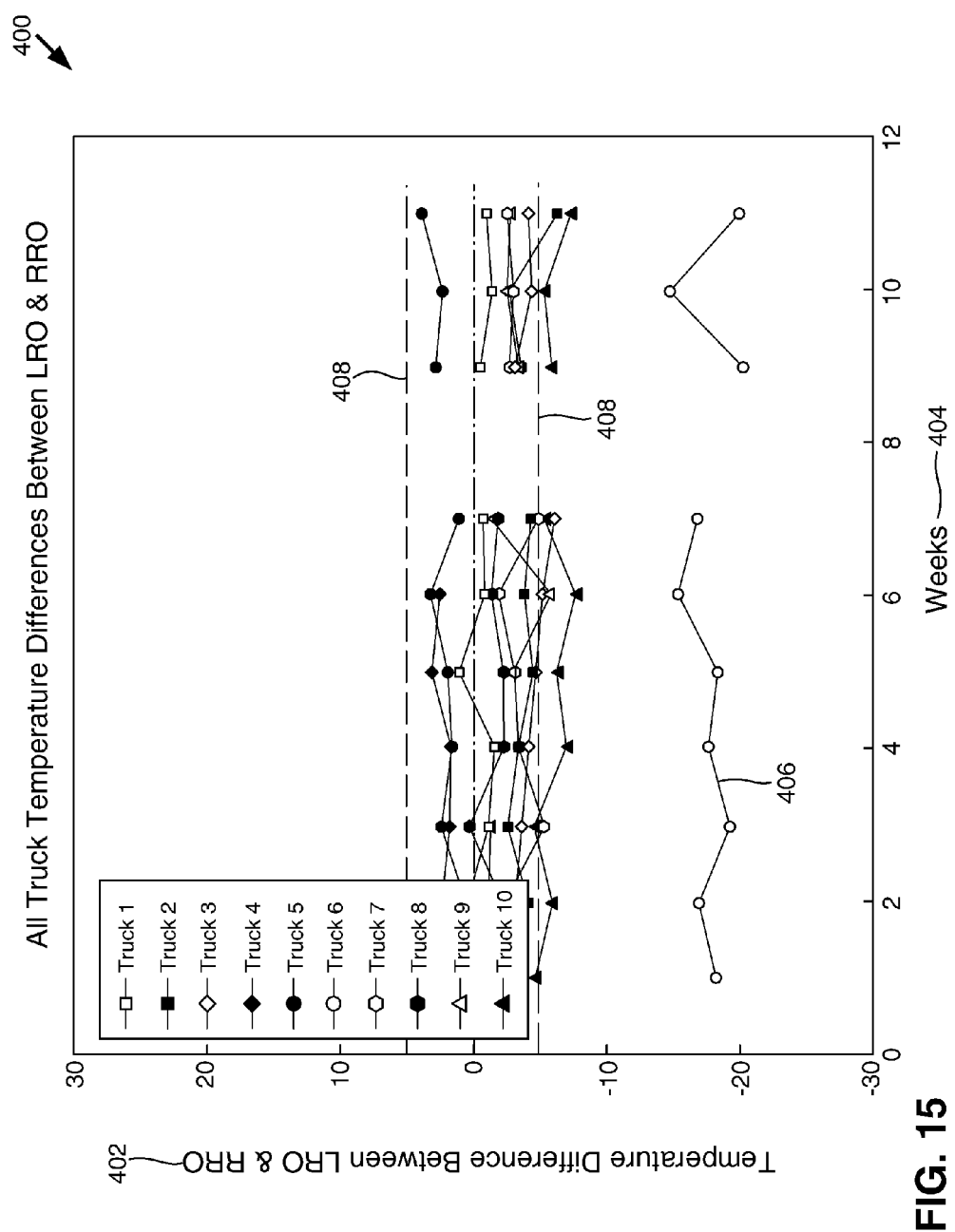
FIG. 15 is an example chart of variances between left rear outer tire average temperatures and right rear outer tire average temperatures for a plurality of trucks that may be analyzed by the hardware and software environment of FIG. 3.

Similarly, FIG. 14 provides an example chart 380 that illustrates a determined variance 382 (in this example, a temperature difference between a LFO and RFO tire) for 10 vehicles (in this example, trucks numbered 1-10) over an 11 week period 384. As shown in this example, the variances 382 for each truck are generally within a predefined threshold 386. Therefore, for the example, embodiments of the invention may determine that the LFO and RFO tires of each vehicle have a normal status and/or that no wheel related issues associated with the LFO and RFO wheels are occurring. FIG. 15 provides an example chart 400 that illustrates a determined variance 402 (in this example, a temperature difference between a LRO and RRO tire) for 10 vehicles (in this example, trucks numbered 1-10) over an 11 week period 404. In this example, the variance for truck 6 406 is beyond a predefined threshold 408, indicating that the status of the LRO and RRO are abnormal for truck 6, and therefore, a wheel related issue may be present at the LRO and/or RRO wheel.

Figure 16:
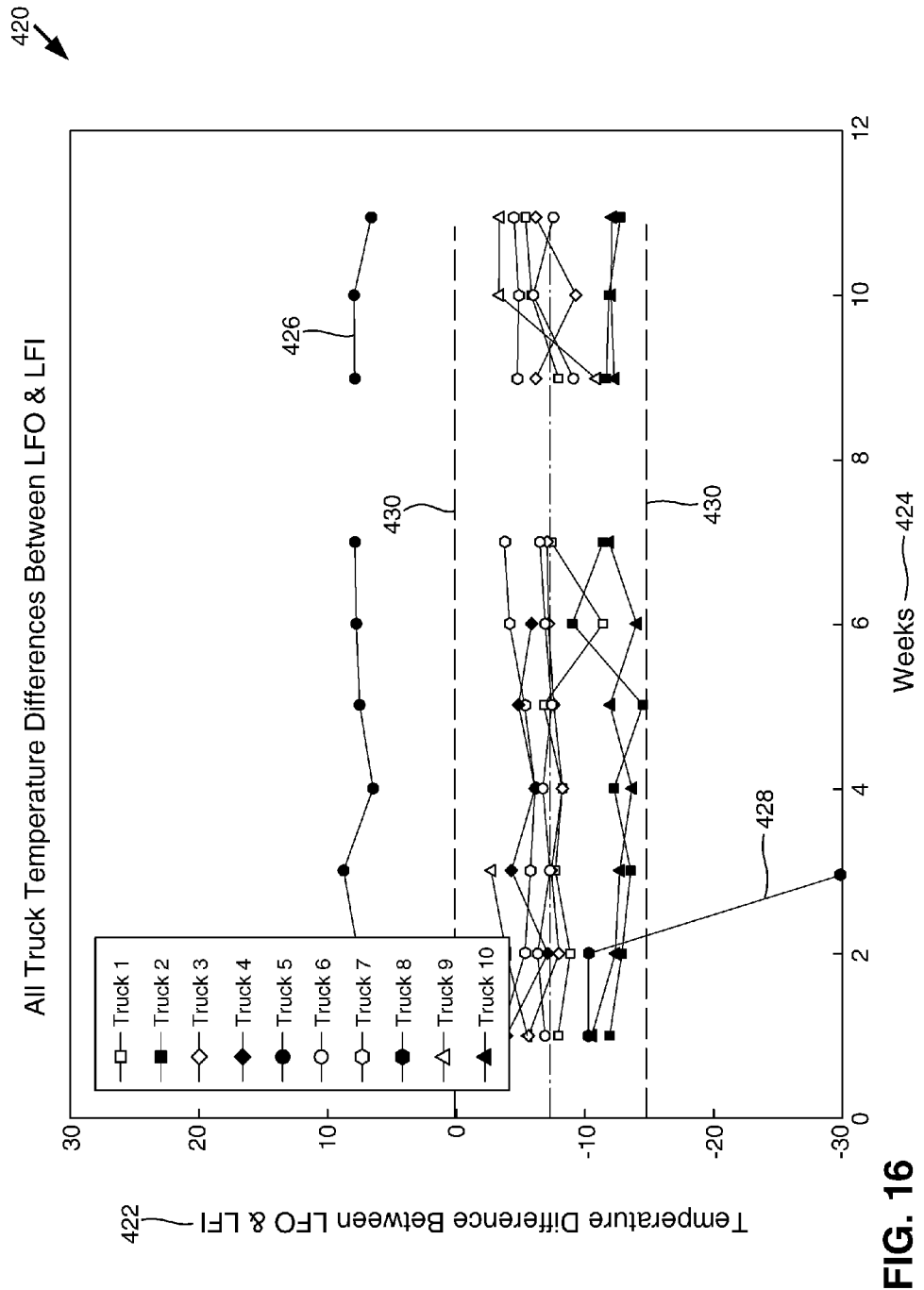
FIG. 16 is an example chart of variances between left front outer tire average temperatures and left front inner tire average temperatures for a plurality of trucks that may be analyzed by the hardware and software environment of FIG. 3.

FIG. 16 provides an example chart 420 that illustrates a determined variance 422 (in this example, a temperature difference between a LFO and LFI tire) for 10 vehicles (in this example, trucks numbered 1-10) over an 11 week period 424. In this example, the variance for truck 5 426 and the variance for truck 8 428 do not fall within a predefined threshold 430. In this example, embodiments of the invention may determine that the variance of truck 5 426 and the variance of truck 8 428 indicate that the status of the LFO and LFI tires for trucks 5 and 8 are abnormal, and therefore, that a wheel related issue may be present at the LFO and/or LFI wheels of trucks 5 and/or 8.

Figure 17:
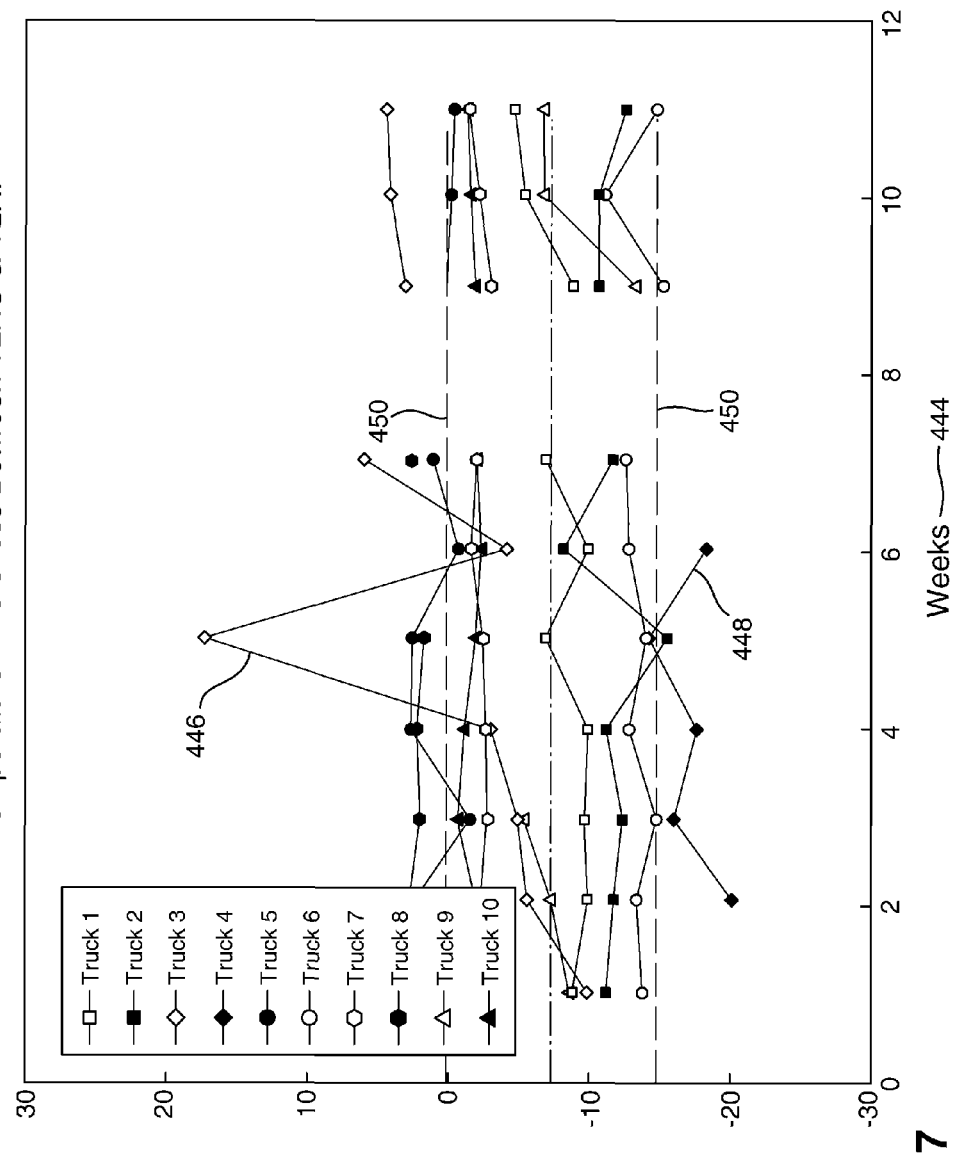
FIG. 17 is an example chart of variances between trailer left rear outer tire average temperatures and trailer left rear inner tire average temperatures for a plurality of trucks that may be analyzed by the hardware and software environment of FIG. 3.

FIG. 17 provides an example chart 440 that illustrates a determined variance 442 (in this example, a temperature difference between a TLRO and TLRI tire) for 10 vehicles (in this example, trucks numbered 1-10) over an 11 week period 444. In this example, the variances for truck 3 446 and truck 4 448 do not fall within a predefined threshold 450. Therefore, for this example, embodiments of the invention may determine that the variance of truck 3 446 and truck 4 448 are abnormal and that a wheel related issue may be present at the TLRO and/or TLRI wheels of trucks 3 and 4.

Figure 18:
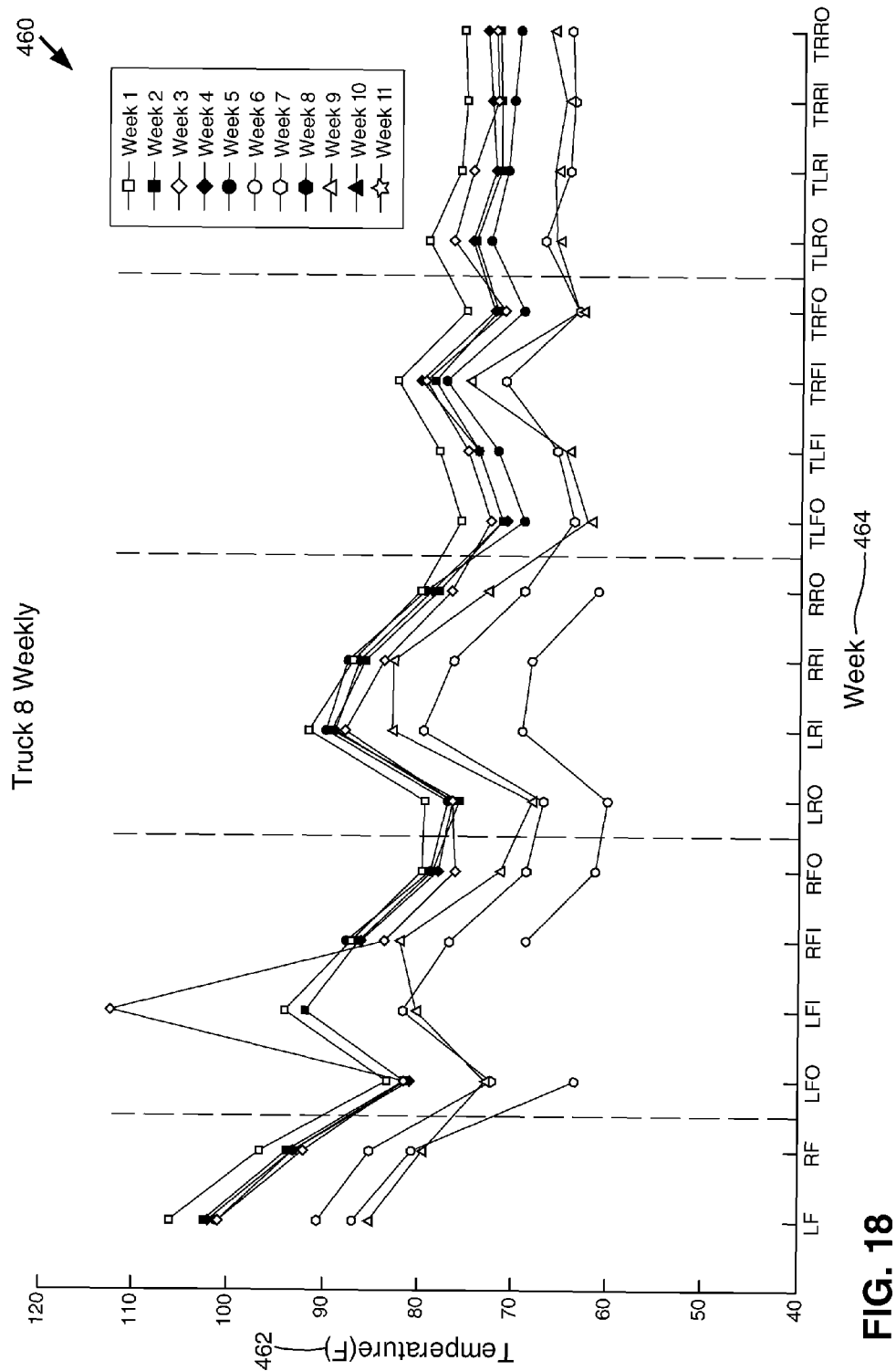
FIG. 18 is an example chart of weekly average temperature values for tires of a truck that may be received and analyzed by the hardware and software environment of FIG. 3.
Figure 19:
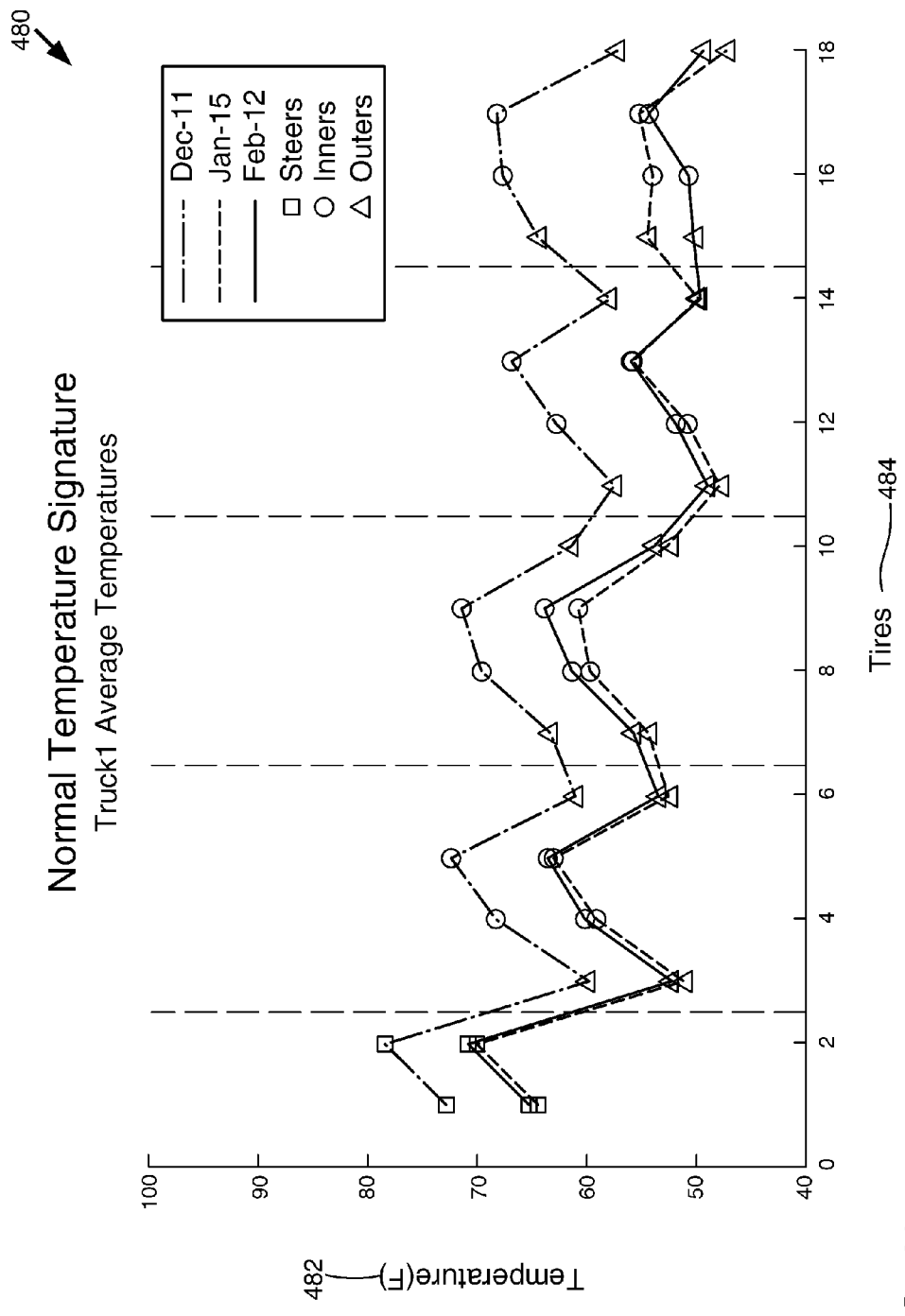
FIG. 19 is an example chart of weekly average temperature values for tires of a truck that may be received and analyzed by the hardware and software environment of FIG. 3.

FIG. 18 provides an example chart 460 that illustrates weekly average temperature values 462 for each tire 464 a particular vehicle (in this example, truck 8). As compared to the example chart 340 of FIG. 12, the difference between the average temperature for the LFI tire and the LFO tire as well as the difference between the LFI tire and the RFI tire may indicate that the LFI tire is abnormal, and that a wheel related issue is present at the LFI wheel of truck 8. Similarly, FIG. 19 provides an example chart 480 that illustrates weekly average temperatures 482 for each tire 484 of a particular vehicle (in this example, truck 1). As discussed, a model may be developed based on temperature data collected from one or more tires of one or more vehicles. This example illustrates a normal average temperature values, i.e., where the temperature data is collected from a vehicle having no wheel related issues equipped with new tires.

Therefore, consistent with embodiments of the invention, a wheel issue, such as an alignment issue, a brake issue, a bearing issue, an axle issue, and/or other such types of issues, associated with the wheels of a vehicle may be detected. In general, such wheel related issues may lead to lower fuel efficiency and/or higher maintenance costs. However, in many conventional systems used for vehicle maintenance of a fleet of vehicles, a cost associated with inspecting for such wheel related issues may be prohibitive to performing regular inspections. Embodiments of the invention may identify vehicles in a fleet of vehicles experiencing wheel related issues, so that resources may be utilized for correcting detected issues on identified vehicles. In turn, the identification of vehicles having wheel related issues may lead to increased fuel efficiency and reduced maintenance costs. In such embodiments, TPMS data (e.g., GPS data, tire cavity temperature data, tire pressure data, vehicle speed data, vehicle location data, odometer data, etc.) may be analyzed to detect wheel related issues for a vehicle.

Figure 20:
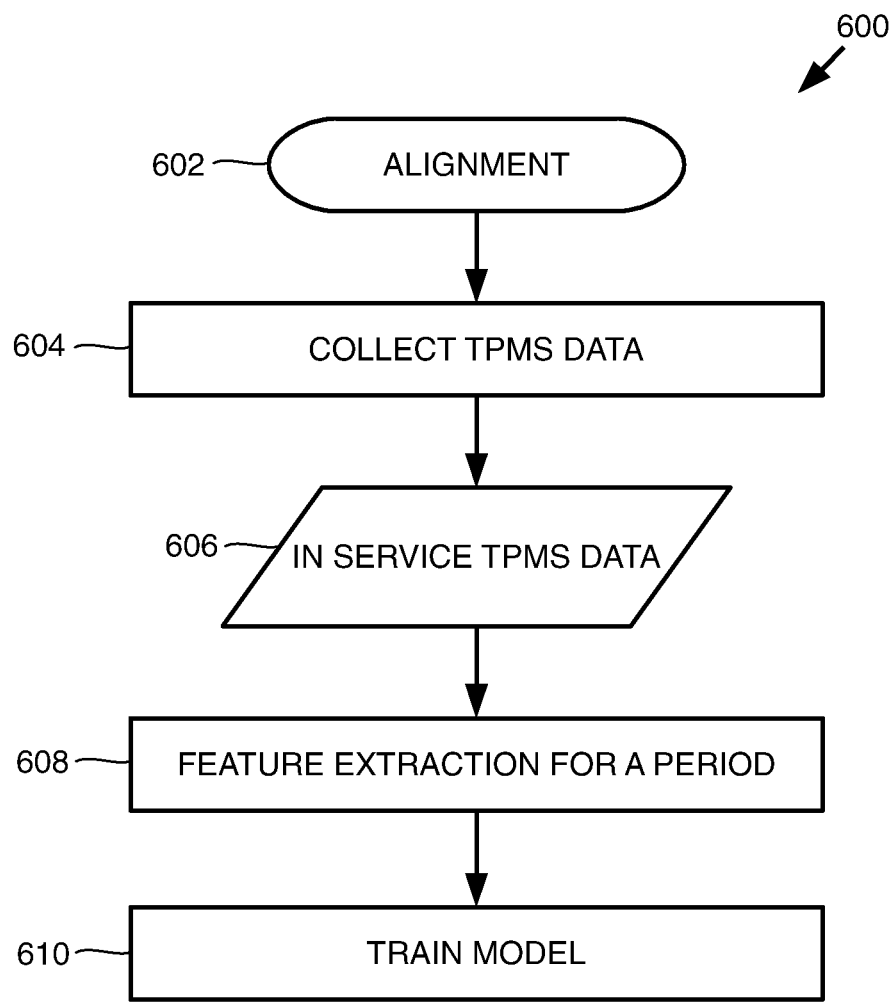
FIG. 20 is a flowchart that illustrates a sequence of operations that may be performed by the hardware and software environment of FIG. 3 to train a model for detecting wheel related issues consistent with embodiments of the invention.

Turning now to FIG. 20, this figure provides a flowchart 600 that illustrates a sequence of operations that may be performed by a computer consistent with embodiments of the invention to train a model that is maintained to detect wheel related issues for a vehicle consistent with embodiments of the invention. As shown in FIG. 20, after receiving a notification indicating that a vehicle has been aligned (block 602), the computer may collect TPMS data for one or more tires of the vehicle (block 604). In service TPMS data (block 606), i.e., data collected during usage of the vehicle may be analyzed by the computer to extract one or more features for a period (block 608). As will be described in further detail, feature extraction may include determining one or more variances between data values for different tires of the vehicle, such as a variance between an average temperature for a left front and right front tire of the vehicle. The one or more extracted features may input into the model to thereby train the model (block 610), where the data will correspond to a vehicle that has recently been aligned.

Figure 21:
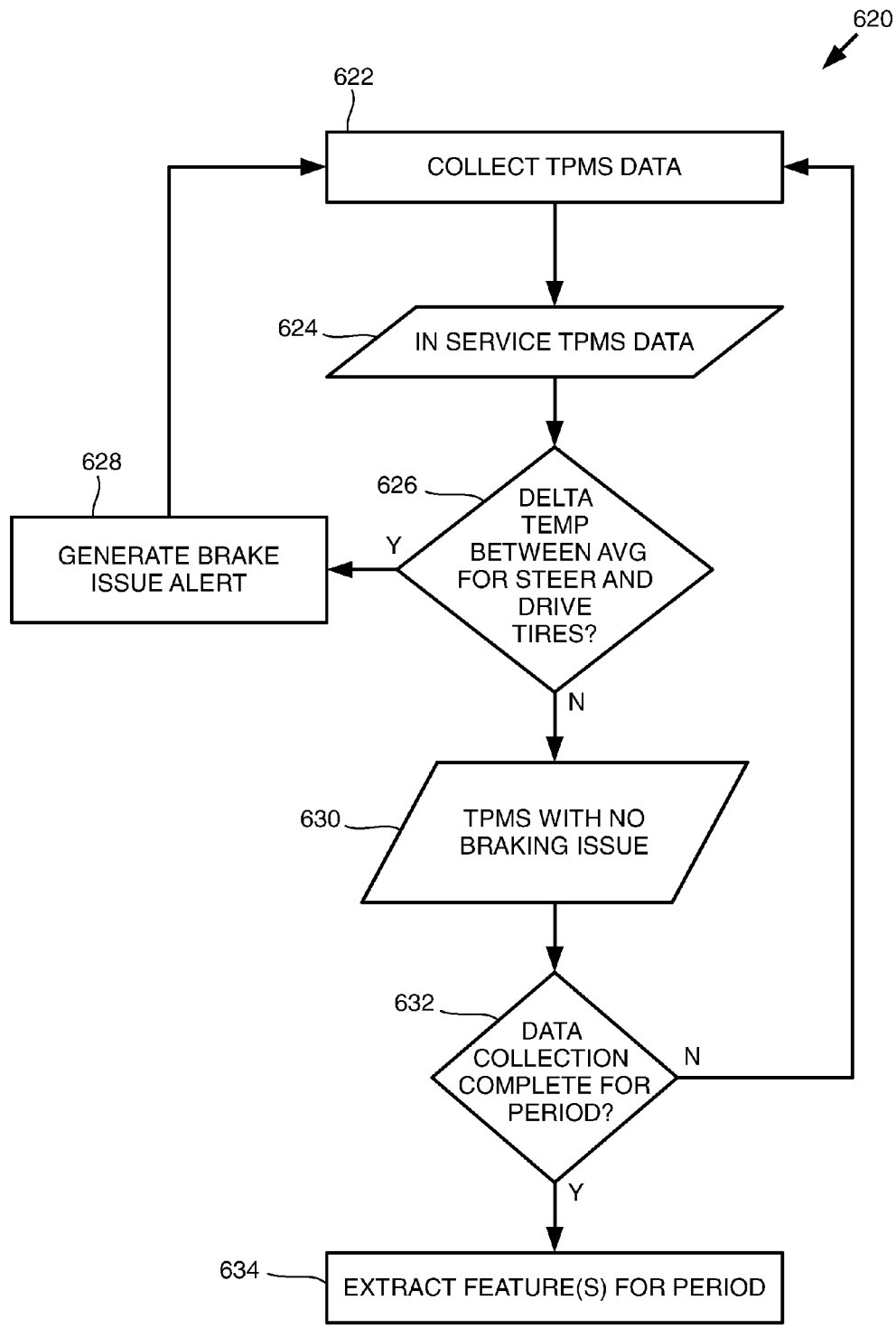
FIG. 21 is a flowchart that illustrates a sequence of operations that may be performed by the hardware and software environment of FIG. 3 to extract one or more features from collected tire data.

FIG. 21 provides a flowchart 620 that illustrates a sequence of operations that may be performed by a computer consistent with embodiments of the invention to extract one or more features (e.g., average temperature variance between two tires over a given period) from TPMS data received for tires of a vehicle for analysis with a model associated with the vehicle. The computer collects TPMS data (block 622), and in service TPMS data (block 624) may be analyzed to determine whether the TPMS data indicates a temperature difference (e.g., a delta, a variance) between an average temperature for steer tires and an average temperature for drive tires (block 626). In response to determining that the TPMS data indicates a temperature delta ("Y" branch of block 626), the computer may generate a brake issue alert to thereby notify personnel that the TPMS data indicates that a brake issue may be occurring (block 628).

In response to determining that the TPMS data does not indicate a temperature delta ("N" branch of block 626), the computer therefore analyzes TPMS data (e.g., temperature data, pressure data, GPS data, odometer data, etc.) that does not correspond to a braking issue (block 630) to determine whether data collection is complete for a period (block 632). In general, a period may be predefined, and may correspond to a day, a week, a month, etc. Therefore, consistent with embodiments of the invention, depending on the predefined period, a vehicle may be monitored based on data collected for the period. In response to determining that data collection is not complete for the period ("N" branch of block 632), the computer may continue collecting and evaluating TPMS data (e.g., blocks 622-632). For example, if the monitoring process analyzes weekly data to detect wheel related issues, if the collected TPMS data is not for an entire week, the computer may continue collecting TPMS data. In response to determining that data collection is complete for the period ("Y" branch of block 632), the computer may extract one or more features for the period (block 634). For example, the computer may extract an average temperature/pressure for the period for each tire of the vehicle, an average temperature/pressure variance between two or more tires, etc.

Figure 22:
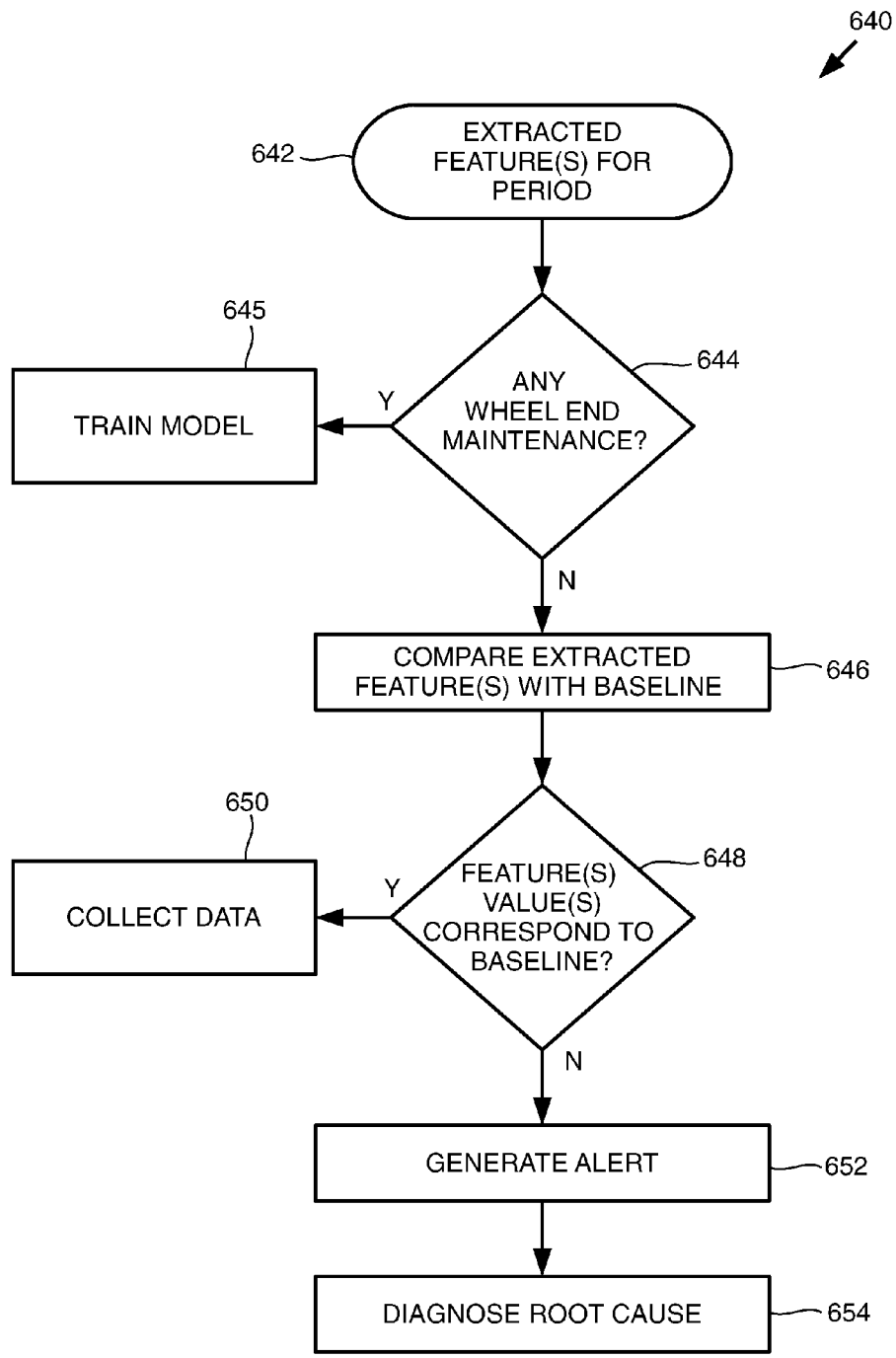
FIG. 22 is a flowchart that illustrates a a sequence of operations that may be performed by the hardware and software environment of FIG. 3 to evaluate one or more extracted features associated with tire data.

Turning now to FIG. 22, this figure provides a flowchart 640 that illustrates a sequence of operations that may be performed by a computer to evaluate one or more features extracted from TPMS data collected from tires of a vehicle for a period consistent with embodiments of the invention. The computer may analyze the one or more extracted features (block 642), and the computer may determine whether any wheel end maintenance has been performed for the vehicle (block 644). As discussed previously, by analyzing maintenance records associated with the vehicle, the computer may determine whether an alignment or other such wheel end maintenance has recently been performed on the vehicle. In response to determining that wheel end maintenance has been performed for the vehicle ("Y" branch of block 644), the computer may train the model (block 645) based at least in part on the one or more extracted features and/or a type of wheel end maintenance performed (e.g., an alignment, a brake maintenance, bearing maintenance, etc.).

In response to determining that no wheel end maintenance has been performed for the vehicle ("N" branch of block 644), the computer may compare the one or more extracted features with a baseline feature set of a model associated with the vehicle (block 646). The computer determines whether the extracted feature values correspond to the baseline feature set of the model (block 648). In general, the extracted features may be compared to the baseline feature set, and if values of the extracted features are within a defined range of the baseline feature set, the extracted features may be determined to correspond to the baseline feature set. In response to determining that the extracted feature values correspond to the baseline feature set ("Y" branch of block 648), the computer may continue collecting and analyzing TPMS data (block 650). In general, if the extracted feature values correspond to the baseline feature set, the vehicle is determined to not be experiencing any wheel related issues. Hence, monitoring will continue as described herein. In response to determining that the values of the extracted features do not correspond to the baseline feature set ("N" branch of block 648), the computer may generate an alert (block 652) to thereby notify personnel that the vehicle may be experiencing a wheel related issue. Furthermore, consistent with some embodiments of the invention, the computer may diagnose a root cause associated with the values of the extracted features not corresponding to the baseline feature set (block 654). In general, the computer may diagnose a root cause by comparing the values of the extracted features to one or more feature sets that model various types of wheel end issues. For example, the computer may compare the extracted features to a feature set that was determined to correspond to an alignment issue to determine whether the root cause for is an alignment issue.

Figure 23:
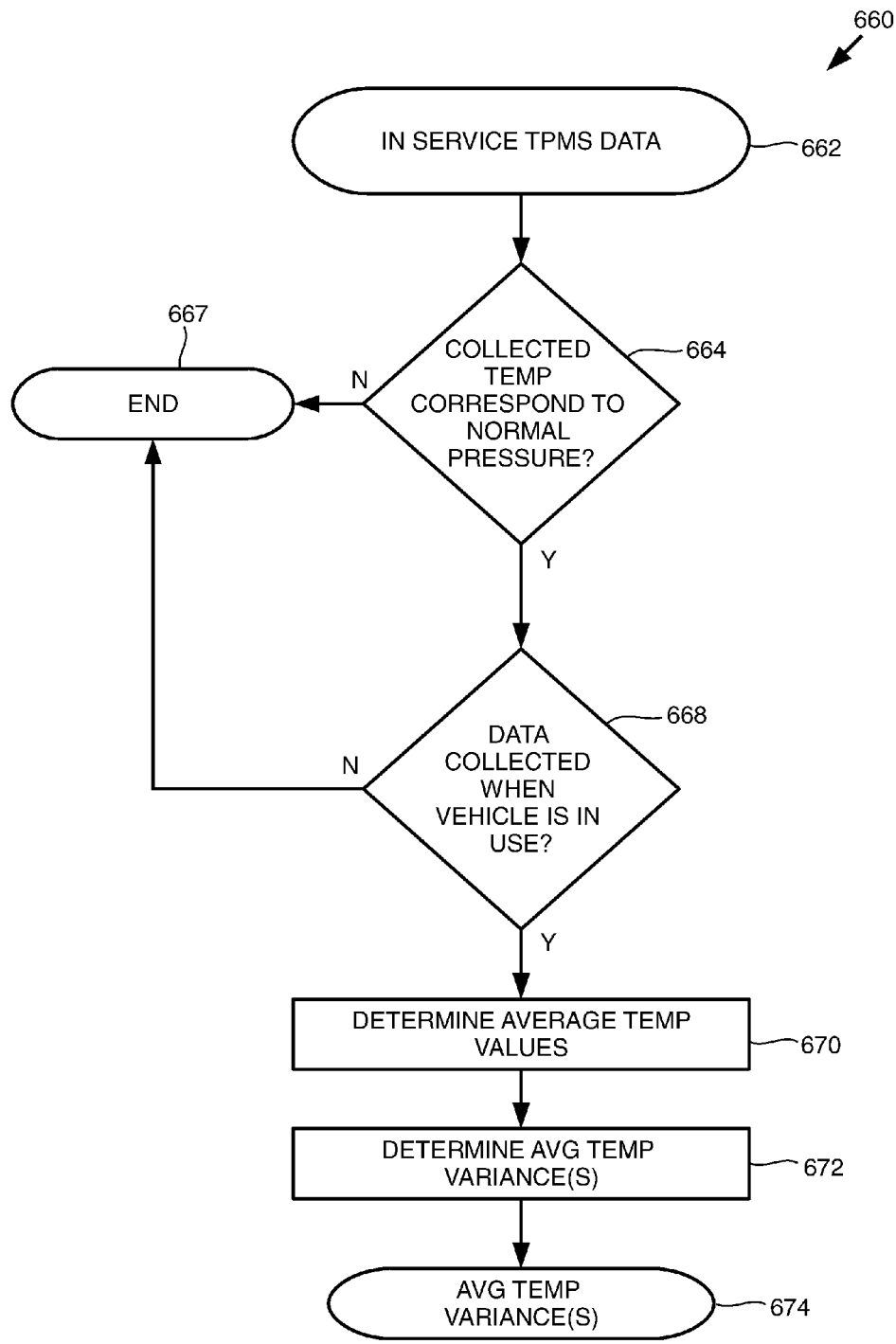
FIG. 23 is a flowchart that illustrates a a sequence of operations that may be performed by the hardware and software environment of FIG. 3 to extract one or more an average temperature variances from tire data of a vehicle.

FIG. 23 provides flowchart 660 that illustrates a sequence of operations that may be performed by a computer to extract a feature associated with TPMS data collected for tires of a vehicle consistent with embodiments of the invention. In service TPMS data (block 662), such as temperature data with no braking issue, timestamp data corresponding to the TPMS data, in service pressure data, etc., may be analyzed to determine if temperature data of the TPMS data corresponds to a normal pressure for the each tire from which the TPMS data was collected (block 664). If the temperature data does not correspond to normal pressures ("N" branch of block 664), the process may end (block 667). In general, if the pressure of each tire is not a normal pressure, then features associated with the temperature data should not be extracted, as the temperature data may not be reliable for analysis with a model.

In response to determining that the collected temperature data corresponds to normal pressure values ("Y" branch of block 664), the computer may determine whether the data was collected with the vehicle was in use (e.g., not parked) (block 668). If the data was collected when the vehicle was not in use ("N" branch of block 668), the process may end (block 667), as features extracted from such data may not be reliable for analysis with a model. In response to determining that the collected TPMS data was collected when the vehicle was in use ("Y" branch of block 668), the computer may determine an average temperature value for each tire of the vehicle for a desired period (e.g., day, week, month, etc.) (block 670). The computer may determine an average temperature variance between pairs of tires of the vehicle (block 672), and each average temperature variance may be an extracted feature (block 674).

Figure 24:
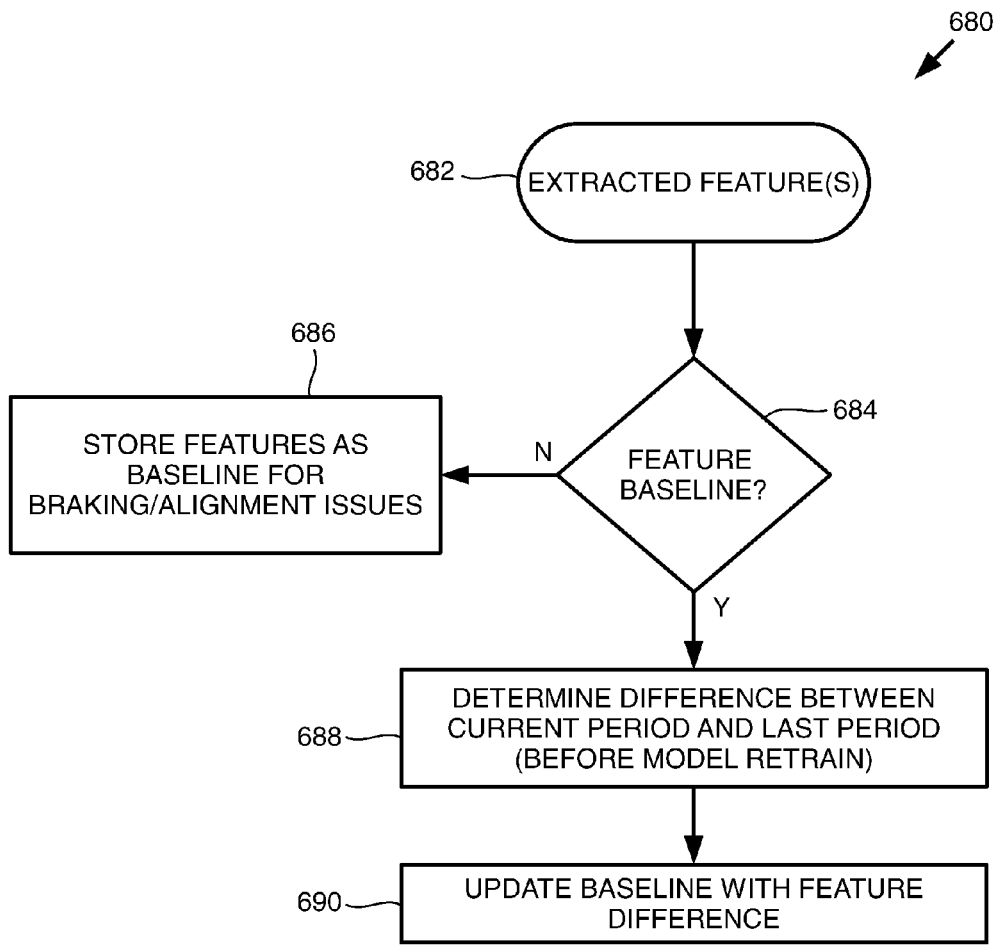
FIG. 24 that illustrates a a sequence of operations that may be performed by the hardware and software environment of FIG. 3 to train a model associated with a vehicle based on one or more features extracted from tire data collected for the vehicle.

Referring to FIG. 24, this figure provides a flowchart 680 that illustrates a sequence of operations that may be performed by a computer to train a model associated with a vehicle based on one or more features extracted from TPMS data collected for tires of the vehicle. The computer may analyze the extracted features (block 682), and the computer may determine whether a feature baseline has been stored in the model for the vehicle (block 684). In response to determining that a feature baseline has not been stored ("N" branch of block 684), the computer may store the one or more extracted features as a feature baseline (block 686). In response to determining that a feature baseline has been stored ("Y" branch of block 684), the computer determines a difference between the one or more extracted features and extracted features received for a previous period—i.e., the period before determining to retrain the model (block 688). The feature baseline may be updated with the determined difference (block 690) to thereby retrain the model based at least in part on the one or more extracted features.

It will be appreciated that the determination of a mean or median using a subset of tires from a vehicle may be implemented in various manners consistent with the invention, and may include various numbers and combinations of tires from a vehicle. For example, a mean or median may be taken from each axle, from each tire type (e.g., steer/drive/trailer), or from steer, inner drive, outer drive, inner trailer and/or outer trailer tires. Alternatively, a mean or median may be taken from the maximum and minimum, or the second maximum and second minimum from any of the aforementioned tire combinations. The invention, however, is not limited to the particular determinations disclosed herein.

It will also be appreciated that while the illustrated embodiments utilize tire data such as pressure, temperature and timestamps, additional data, such as ambient temperature, tread depth, additional temperatures taken at different points on a tire, rim or wheel, vibration, etc. may also be used in a tire monitoring system consistent with the invention. Therefore, the invention is not limited to the particular embodiments discussed herein.

Various additional modifications may be made without departing from the spirit and scope of the invention. Therefore, the invention lies in the claims hereinafter appended.

What is claimed is:

1. A method of monitoring a vehicle for wheel related issues, the method comprising:

measuring, by a plurality of tire pressure monitoring system sensors installed respectively on each of a plurality of tires of a vehicle, temperature data for the plurality of tires;

analyzing, by a processor, the temperature data to determine whether a status of each tire of the vehicle is normal; and in response to determining that a status for at least one tire of the plurality of tires is not normal, determining, by the processor, whether a wheel related issue is present for the vehicle based at least in part on the temperature data for the at least one tire, and signaling an alarm for an operator regarding the wheel related issue when determined to be present, wherein the wheel related issue comprises at least one of an alignment issue, a brake issue, and a wheel bearing issue, and wherein the wheel related issue does not include issues associated specifically with a tire, including tire pressure and tire wear, and wherein determining whether a wheel related issue is present for the vehicle based at least in part on the temperature data for the at least one tire comprises:

analyzing the temperature data for the at least one tire using a particular model corresponding to each type of wheel related issue, the particular model defined by patterns of temperature data that have been previously associated with at least one of an alignment issue, a brake issue, and a wheel bearing issue, such that the temperature data for the at least one tire can be compared to the patterns of temperature data to identify the wheel related issue when present.

2. The method of claim 1, wherein analyzing the temperature data to determine whether the status of each tire of the vehicle is normal comprises:

determining a variance between temperature values of a pair of related tires of the vehicle, wherein analyzing the temperature data to determine whether the status of each tire of the vehicle is normal is based at least in part on the variance between the temperature values of the pair of related tires of the vehicle.

3. The method of claim 2, wherein analyzing the temperature data to determine whether the status of each tire of the vehicle is normal is based at least in part on whether the variance between temperature values of the pair of related tires of the vehicle is within a predefined threshold.

4. The method of claim 1, wherein analyzing the temperature data to determine whether a status of each tire of the vehicle is normal comprises:

determining a weighted average temperature value for each tire of the vehicle for a defined time period.

5. The method of claim 4, wherein analyzing the temperature data to determine whether a status of each tire of the vehicle is normal comprises:

determining a variance between the weighted average temperature value of each tire and the weighted average temperature value for at least one related tire; and comparing each respective variance to a threshold variance that is associated with the respective variance, wherein analyzing the temperature data to determine whether a status of each tire of the vehicle is normal is based at least in part on whether each respective variance is within the associated threshold variance.

6. The method of claim 1, further comprising:

filtering the temperature data based at least in part on odometer data associated with the vehicle.

7. An apparatus, comprising:

a plurality of tire pressure monitoring system sensors installed respectively on each of a plurality of tires of a vehicle, the plurality of tire pressure monitoring system sensors measuring temperature data for the plurality of tires;

at least one processor communicating with the plurality of tire pressure monitoring system sensors; and program code configured upon execution by the at least one processor to cause the at least one processor to receive temperature data for each of a plurality of tires of a vehicle, analyze the temperature data to determine whether a status of each tire of the vehicle is normal, and responsive to determining that a status for at least one tire of the plurality of tires is not normal, determine whether a wheel related issue is present for the vehicle based at least in part on the temperature data for the at least one tire, wherein the wheel related issue comprises at least one of an alignment issue, a brake issue, and a wheel bearing issue, and wherein the wheel related issue does not include issues associated specifically with a tire, including tire pressure and tire wear, wherein the program code is configured to cause the at least one processor to determine whether a wheel related issue is present for the vehicle based at least in part on the temperature data for the at least one tire by:

analyzing the temperature data for the at least one tire using a particular model corresponding to each type of wheel related issue, the particular model defined by patterns of temperature data that have been previously associated with at least one of an alignment issue, a brake issue, and a wheel bearing issue, such that the temperature data for the at least one tire can be compared to the patterns of temperature data to identify the wheel related issue when present.

8. The apparatus of claim 7, wherein the program code is configured to cause the at least one processor to analyze the temperature data to determine whether the status of each tire of the vehicle is normal by:

determining a variance between temperature values of a pair of related tires of the vehicle, wherein analyzing the temperature data to determine whether the status of each tire of the vehicle is normal is based at least in part on the variance between the temperature values of the pair of related tires of the vehicle.

9. The apparatus of claim 8, wherein the program code is configured to cause the at least one processor to analyze the temperature data to determine whether the status of each tire of the vehicle is normal based at least in part on whether the variance between temperature values of the pair of related tires of the vehicle is within a predefined threshold.

10. The apparatus of claim 7, wherein the program code is configured to cause the at least one processor to analyze the temperature data to determine whether the status of each tire of the vehicle is normal by:

determining a weighted average temperature value for each tire of the vehicle for a defined time period;

determining a variance between the weighted average temperature value of each tire and the weighted average temperature value for at least one related tire; and comparing each respective variance to a threshold variance that is associated with the respective variance, wherein analyzing the temperature data to determine whether a status of each tire of the vehicle is normal is based at least in part on whether each respective variance is within the associated threshold variance.

11. The apparatus of claim 7, wherein the program code is further configured upon execution to cause the at least one processor to generate an alarm that includes information corresponding to the wheel related issue and the vehicle responsive to determining that a wheel related issue is present for the vehicle.

12. The apparatus of claim 7, wherein the program code is further configured upon execution to cause the at least one processor to filter the temperature data based at least in part on odometer data associated with the vehicle.

* * * * *